United States Patent
Boukari

(10) Patent No.: US 12,194,405 B2
(45) Date of Patent: Jan. 14, 2025

(54) METHOD AND DEVICE FOR REDUCING THE INCREASE IN TEMPERATURE AT THE SURFACE OF THE TERRESTRIAL GLOBE, VEHICLE AND STATION FOR IMPLEMENTING SAID METHOD

(71) Applicants: PRODOSE, Bessieres (FR); Morou Boukari, Toulouse (FR)

(72) Inventor: Morou Boukari, Toulouse (FR)

(73) Assignees: PRODOSE, Bessieres (FR); Morou Boukari, Toulouse (FR)

( * ) Notice: Subject to any disclaimer, the term of this patent is extended or adjusted under 35 U.S.C. 154(b) by 648 days.

(21) Appl. No.: 17/416,042

(22) PCT Filed: Dec. 19, 2019

(86) PCT No.: PCT/FR2019/053213
§ 371 (c)(1),
(2) Date: Jun. 18, 2021

(87) PCT Pub. No.: WO2020/128371
PCT Pub. Date: Jun. 25, 2020

(65) Prior Publication Data
US 2022/0062786 A1   Mar. 3, 2022

Related U.S. Application Data

(60) Provisional application No. 62/946,712, filed on Dec. 11, 2019, provisional application No. 62/906,208, (Continued)

(51) Int. Cl.
*B01D 5/00* (2006.01)
*B01D 53/00* (2006.01)
(Continued)

(52) U.S. Cl.
CPC ......... *B01D 5/0003* (2013.01); *B01D 53/002* (2013.01); *B01D 53/1475* (2013.01);
(Continued)

(58) Field of Classification Search
None
See application file for complete search history.

(56) References Cited

U.S. PATENT DOCUMENTS 3,985,107 A * 10/1976 Ueno .................. F02B 43/10
123/3
6,170,264 B1 * 1/2001 Viteri .................. F02B 75/02
60/671
(Continued)

OTHER PUBLICATIONS

Belin et al., "Thirty years of observation of microalgae and algae toxins on the coast," editions Quae, Dec. 3, 2018, pp. 7-8.
(Continued)

*Primary Examiner* — Jason M Greene
(74) *Attorney, Agent, or Firm* — NIXON & VANDERHYE

(57) ABSTRACT

Disclosed is a method for reducing the increase in temperature at the surface of the earth and the increase in the content of carbon dioxide in the atmosphere due to the fossil fuel and non-fossil fuel combustion operations, remarkable in that it consists in reducing the increase in the temperature of the earth and the increase in the content of carbon dioxide in the atmosphere, which reductions in the temperature of the earth and of the content of carbon dioxide are achieved by reducing the drop in the oxygen content in the atmosphere, which reduction in the drop in the oxygen content includes: producing pure oxygen or producing hydrogen peroxide, and using for fuel combustion the oxygen or hydrogen peroxide to reduce the consumption of oxygen contained in the air during the combustion operations. Also disclosed is
(Continued)

the device, the vehicle and the plant for carrying out the method.

17 Claims, 21 Drawing Sheets

Related U.S. Application Data filed on Sep. 26, 2019, provisional application No. 62/868,380, filed on Jun. 28, 2019, provisional application No. 62/861,753, filed on Jun. 14, 2019, provisional application No. 62/853,301, filed on May 28, 2019, provisional application No. 62/844,231, filed on May 7, 2019, provisional application No. 62/800,768, filed on Feb. 4, 2019, provisional application No. 62/790,047, filed on Jan. 9, 2019, provisional application No. 62/783,274, filed on Dec. 21, 2018.

(51) Int. Cl.
    *B01D 53/14*     (2006.01)
    *B01D 53/26*     (2006.01)

(52) U.S. Cl.
    CPC ........ *B01D 53/265* (2013.01); *B01D 2251/30* (2013.01); *B01D 2256/10* (2013.01); *B01D 2256/22* (2013.01); *B01D 2258/01* (2013.01); *B01D 2258/02* (2013.01)

(56) References Cited

U.S. PATENT DOCUMENTS

| | | | |
|---|---|---|---|
| 6,375,920 B2 | 4/2002 | Fischer et al. | |
| 2005/0031522 A1* | 2/2005 | Delaney | C01B 13/0214 422/211 |
| 2013/0247886 A1* | 9/2013 | Hamad | C01B 13/0259 123/704 |

OTHER PUBLICATIONS

Bensakhria A. and Leturia M., "Natural Gas Oxy-combustion with Flue Gas Recycling for CO2 Capture," Chemical Engineering Transactions, vol. 1, Jan. 1, 2010, pp. 637-642.
Hu et al., "Integration of Evaporative Gas Turbine with Oxy-Fuel Combustion for Carbon Dioxide Capture", International Journal of Green Energy, vol. 7, No. 6, Dec. 14, 2010, pp. 615-631.
Burness, "Oxygen from Hydrogen Peroxide: An Experimental Modification", Journal of Chemical Education, vol. 73, No. 9, Sep. 1, 1996, p. 851.
Nasa Airspace, "Making Oxygen and Carbon Dioxide", Aeronautics Research Mission Directorate, Dec. 31, 2010, 22 pages.
International Search Report for PCT/FR2019/053213 mailed Jun. 25, 2020, 4 pages.
Written Opinion of the ISA for PCT/FR2019/053213 mailed Jun. 25, 2020, 12 pages.
Belin et al., "Quels "Services" Le Phytoplancton Procure-T-Il?" In: Trente Années D'Observations des Microalgues et des Toxines D'Algues Sur Le Littoral, 78026 Versailles Cedex, Dec. 3, 2018, pp. 7-8. [Submission Pending].
Leturia et al., "Natural gas oxy-combustion with flue gas recycling for CO 2 capture Natural gas oxy-combustion with flue gas recycling for CO 2 capture", Chemical Engineering Transactions, vol. 1, Jan. 1, 2010. [Submission Pending].
Hu et al., "Integration of Evaporative Gas Turbine with Oxy-Fuel Combustion for Carbon Dioxide Capture", International Journal of Green Energy, vol. 7, No. 6, Dec. 14, 2010, pp. 615-631. [Submission Pending].
Burness, "Oxygen from Hydrogen Peroxide: An Experimental Modification", Journal of Chemical Education, vol. 73, No. 9, Sep. 1, 1996, p. 851. [Submission Pending].
Nasa Airspace, "Making Oxygen and Carbon Dioxide", Dec. 31, 2010, pp. 1-24. [Submission Pending].

\* cited by examiner

METHOD AND DEVICE FOR REDUCING THE INCREASE IN TEMPERATURE AT THE SURFACE OF THE TERRESTRIAL GLOBE, VEHICLE AND STATION FOR IMPLEMENTING SAID METHOD

This application is the U.S. national phase of International Application No. PCT/FR2019/053213 filed Dec. 19, 2019 which designated the U.S. and claims priority to 62/783,274 filed Dec. 21, 2018, 62/790,047 filed Jan. 9, 2019, 62/800,768 filed Feb. 4, 2019, 62/844,231 filed May 7, 2019, 62/853,301 filed May 28, 2019, 62/861,753 filed Jun. 14, 2019, 62/868,380 filed Jun. 28, 2019, 62/906,208 filed Sep. 26, 2019, and 62/946,712 filed Dec. 11, 2019, the entire contents of each of which are hereby incorporated by reference.

BACKGROUND OF THE INVENTION

Field of the Invention

The invention relates to global warming, to the original analysis of its causes and in particular to technical solutions allowing the problems at the origin of these causes to be solved under the best conditions.

Description of the Related Art

For several centuries, there has been a general increase in the temperature at the surface of the earth (temperature of the air and the oceans). To explain this increase in temperature on the surface of the earth, a hypothesis has been put forward by climate specialists. According to these specialists, the increase in the temperature on the surface of the earth is linked to an increase in the concentration of carbon dioxide in the atmosphere of the earth, which increase in the concentration of carbon dioxide is linked to an increasing emission of carbon dioxide into the air by human activities linked to the increasing use of fossil fuels. To avoid the increase in temperature at the surface of the earth, it has been proposed by these specialists and on the basis of their hypothesis made above, to avoid using fossil fuels in human activity at the surface of the earth in order to limit carbon dioxide emissions into the air.

But the observations and research work of the applicant have shown that this hypothesis put forward by these specialists on the origin of the increase in the content of carbon dioxide in the air (increase linked to an increasing emission of carbon dioxide in the air by the increasing use of fossil fuels) is false and that the technical solution proposed to solve this problem is therefore unsuitable and does not make it possible to solve the problem posed.

Emissions of carbon dioxide in the air or the increasingly large emissions of carbon dioxide in the air are not the main parameter responsible for the increase each year in the concentration of carbon dioxide in the atmosphere of the earth, nor for the increase in temperature at the surface of the earth.

SUMMARY OF THE INVENTION

The applicant carried out research on the causes of global warming which led to make the following observations.
First Observation
The observations and research carried out by the applicant have indeed shown that the increase in the concentration of carbon dioxide in the atmosphere of the earth is mainly (firstly) linked to a decrease in the concentration of oxygen in the atmosphere of the earth, which decrease in oxygen concentration is linked to:

on the one hand, an increase in the consumption of oxygen contained in the air by an increasing use of air by humans in their activities (increasing use of air in the combustion of fossil fuels and non-fossil fuels) by the increase in human population (overall increase in the consumption of oxygen from the air for human respiration), on the other hand, the ever-greater decrease in the sources of oxygen production on the surface of the earth (disappearance of forests and phytoplankton responsible for the production and emission of oxygen in the atmosphere of the earth).

The main constituents of the air in the atmosphere of the earth are, in decreasing order, nitrogen, then oxygen, then argon, then carbon dioxide. The concentration of carbon dioxide being about more than 500 times lower than that of dioxygen, more than 1900 times lower than that of nitrogen, more than 22 times lower than that of argon, a very small decrease in oxygen concentration in the air causes a noticeable increase in the concentration of carbon dioxide in the air.

Each year, human activity directly consumes with the use of fossil fuels approximately 59 billion tons of oxygen contained in atmospheric air and generates in this atmosphere approximately 37 billion tons of carbon dioxide. This consumption of oxygen from the air causes a decrease in the volume concentration of oxygen in the atmosphere of the earth. By our calculations, this decrease in oxygen concentration in the air (volume by volume) is approximately 0.0007% (7 ppm) per year.

The consumption of oxygen by human activity on earth and for respiration by terrestrial human beings is on average, per year and by weight, between 1.4 and 1.5 times higher than the amount of carbon dioxide emitted per year by human activity. On the other hand, almost all of the 37 billion tons or at least most of the carbon dioxide emitted by human activity is reabsorbed each year by carbon sinks and is also removed by the 495,000 km3 of water by year from precipitation in the form of carbonates and bicarbonates (more than 110,000 km3 ($1.1 \times 10^{17}$ liters) of water per year from precipitation on the continents and 385,000 km3 of water from precipitation on the oceans). Precipitation alone (495,000 km3 per year) is capable of dissolving all of the 37 billion tons of carbon dioxide emitted into the atmosphere each year, thus producing water with concentrations of dissolved carbon dioxide of about 75 mg/l and a pH ranging from 4.5 to 5. Taking into account the presence in the clouds of certain alkaline substances, the average value of the pH of this water is between 5 and 6, which exactly corresponds to the pH of measured rainwater.

The 0.00015% (1.5 ppm) to 0.0002% (2 ppm) of increase per year in the concentration of carbon dioxide in the atmosphere of the earth would therefore not be linked to the direct release of carbon dioxide into the air by human activity but to the decrease of 0.0007% (7 ppm) of the oxygen concentration in the air. This decrease per year in the volume concentration of oxygen of about 7 ppm in the atmosphere of the earth and linked to the use of air in the combustion of fossil fuels by humans in these activities is as much more aggravated by the destruction of the sources of oxygen production (destruction of forests and elimination of phytoplankton by the pollution of lakes, rivers, streams and oceans by human activity).

According to the applicant's calculations, the decrease in the oxygen concentration in the air (volume by volume)

linked to human activity and human respiration is per year of approximately 0.0054% (54 ppm) while the increase in carbon dioxide concentration in the air observed each year is approximately 0.00014% (1.4 ppm) to 0.0002% (2 ppm). There is thus 27 to 38 times more decrease in oxygen in the air per year than increase in carbon dioxide. In 2015, a decrease in oxygen in the air of about 0.002% (20 ppm) was measured.

Oxygen plays a very important role in limiting global warming (limiting the increase in air and ocean temperature). The decrease in its concentration in the air is very harmful for humanity because:

the decrease in the concentration of oxygen in the air leads to an automatic increase in the concentration of carbon dioxide in the air, which carbon dioxide causes the greenhouse effect by absorption of infrared radiation emitted at night by the land, which can result in an increase in the temperature of the air and the oceans (hence global warming), in the air, oxygen itself absorbs some of the incident solar radiation emitted by the sun. With the decrease in the oxygen concentration in the air, a greater amount of solar radiation reaches the earth and therefore causes global warming, ozone in the stratosphere which absorbs much of the incident solar radiation emitted by the sun is made from oxygen. Less oxygen in the stratosphere means less ozone and more solar radiation reaches the earth, resulting in increased air and ocean temperatures, the decrease in the concentration of oxygen in the air leads to a decrease in the concentration of dissolved oxygen in the oceans, resulting in the death and/or decrease in the number of many aquatic animals such as fish.

The increase in the concentration of carbon dioxide in the atmosphere of the earth is therefore mainly linked to the decrease in the concentration of oxygen in the atmosphere of the earth, and consequently the increase in the temperature at the surface of the earth (air+water) due to the increase in carbon dioxide which is a greenhouse gas is mainly linked to the decrease in the concentration of oxygen in the atmosphere of the earth, which decrease in the oxygen concentration is linked to the consumption of oxygen from the air by human beings on the surface of the earth for their activities and for breathing. This decrease in the oxygen concentration in the atmosphere of the earth is also accentuated by the increasing disappearance of sources of oxygen production on the surface of the earth (forests and phytoplankton).

Second Observation

On the other hand, the combustion gases of fuels are emitted into the air at temperatures above 200-300° Celsius. These combustion gases emit infrared thermal radiation in wavelengths corresponding to the absorption wavelengths of water vapor present in the atmosphere of the earth. This water vapor present in the atmosphere therefore absorbs this infrared radiation emitted by the hot combustion gases, thus causing an increase in the air temperature and therefore global warming. These hot combustion gases contain not only a quantity of energy in the form of sensible heat but also a large quantity of energy in the form of latent heat linked to the presence of a large quantity of water vapor in these combustion gases. This large amount of water vapor (more than 15 billion tons per year) with energy in the form of latent heat (more than $37.5 \times 10^{15}$ Kj) can cause an increase in air temperature of about 0.047° C. per year, i.e. 0.47° C. every 10 years or 4.7° C. every 100 years. If we take into account the sensible heat contribution of these combustion gases, the emission temperature of which can be 200-300° C., we end up with a total increase per year in the air temperature of about of 0.073° C. or 0.73° C. per year or 7.3° C. every 100 years.

In Summary:

The release of carbon dioxide into the atmosphere is not the main cause of global warming. The current global warming is well linked to human activity BUT neither CO2 nor its greenhouse effect are the major causes.

The increase in the content of carbon dioxide in the air of about 2 ppm per year is not mainly due to the increasing releases of carbon dioxide into the atmosphere (these releases can be totally absorbed by the 495,000 km3 per year of precipitation water on the continents and oceans and by the remaining forests), but is the direct consequence of a decrease in the oxygen content in the atmosphere caused:

on the one hand, by the overconsumption of oxygen from the air by humans for their activities (use of air for the combustion of fossil fuels and non-fossil fuels) and by the overconsumption of oxygen in the air linked to the very significant increase in the human population on earth (use of oxygen in the air for respiration), on the other hand, by the destruction by humans of sources of oxygen production (destruction of forests and elimination of phytoplankton by pollution of lakes, rivers and oceans).

The causes of global warming, that is to say the increase in the temperature of the air and the oceans at the surface of the earth are represented according to the iceberg illustrated in the drawing of FIG. 6 where Reference 1 shows the tip of the iceberg, namely minor and measured causes. Reference 2 designates the invisible part of the iceberg: namely the not visible and not measured major causes. Reference 3 designates carbon dioxide (CO2) in the air, it is located in the visible part since it is now designated as the cause of warming.

The invisible part 2 includes:

Reference 4 which represents the reduction in the concentration of $O_2$ in the atmosphere, Reference 5 which represents the large amount of energy released into the air by fossil combustion gases or calories from any heat-generating method, Reference 6 which represents the water vapor resulting from the combustion of fossil or non-fossil fuels or from any method generating water vapor.

The visible emerged part 1 consists of a secondary and minor cause having a limited impact on global warming, a cause measured and represented by the releases of carbon dioxide into the air 3.

The invisible submerged part 2 is made up of main and major causes, having a great impact on global warming, which causes are:

the enormous amount of heat and anthropological water vapor emitted by human activity as well as the destruction of atmospheric oxygen by this human activity which are the main causes.

This quantity of energy released ($11 \times 10^{18}$ kJ from 1850 to 2010, $31 \times 10^{18}$ kJ from 1850 to 2100), the water vapor are the main causes of the increase in the temperature of the atmosphere from 0.4° C. to 0.7° Celsius every 10 years, or 4° C. to 7° Celsius every 100 years!

Water Vapor has a Triple Effect:

Effect No. 1: direct warming of the atmosphere by its latent and sensible heat. This concerns the hot vapor resulting from the combustion of fossil fuels and non-fossil fuels and that of cooling of thermal methods, as well as the water vapor resulting from human respiration, i.e. a quantity of water vapor released during the period 1850 to 2010 of about $3.86 \times 10^{15}$ kg.

Effect No. 2: warming of the earth by its strong greenhouse effect by absorption and/or reflexion of infrared thermal radiation emitted by the earth. This is the case for hot steam from the combustion of fossil fuels and non-fossil fuels and from the cooling of thermal methods, i.e. a quantity of water vapor released during the period 1850 to 2010 of about $3.86 \times 10^{15}$ kg.

This anthropological water vapor greenhouse effect that we have evaluated at 1.7 W/m2 during the period 1850-2010 is able to increase the temperature of the atmosphere of the earth by 3° C.

Effect No. 3: warming of the oceans by blocking the evaporation of their waters thanks to the decrease in the vapor pressure gradient between the water surface and the air. This concerns steam from irrigation, hot steam from the combustion of fossil fuels and non-fossil fuels, steam from thermal method cooling and water vapor from human respiration, i.e. a quantity of water vapor rejected during the period 1850 to 2010 of about $51.3 \times 10^{15}$ kg. This amount of heat is far greater than the amount of vapor that would have been released into the atmosphere by nature due to the warming of the oceans by CO2 ($0.76 \times 10^{15}$ kg during the period 1850-2010). The injection by human activity of $51.3 \times 10^{15}$ kg into the air above the water of the oceans and continents resulted in a blockage of an energy in these waters of $273 \times 10^{21}$ J. This energy blocked will increase the temperature of these waters. For comparison, the IPCC estimates the energy blocked in the water of oceans and continents at $273 \times 10^{21}$ J, from 1971 to 2010, with an increase in ocean temperature of around 1° C.

With the decrease in the oxygen content in the atmosphere caused by the destruction of oxygen in the air during the combustion of fossil fuels ($9.6 \times 10^{15}$ kg of O2 during the period 1850-2010) and not fossils and by the destruction of natural sources of oxygen production, a large part of UV radiation is no longer absorbed by the atmosphere and arrives directly on the continents and the oceans. These unfiltered UV rays increase the temperature of the earth. In addition, this decrease in the oxygen content in the atmosphere represents a great danger for the survival of the human species and of the world of life in general because we are already arriving above certain large industrial cities and densely populated at oxygen deficiency thresholds, less than 19.5%.

Likewise, when oxygen is destroyed in the atmosphere, the oxygen dissolved in water desolubilizes and migrates into the atmosphere to compensate for this loss, causing the oxygen content in the seas and the oceans to decrease.

The applicants' experiments have shown the fact that when the oxygen concentration in the air decreases, the CO2 content increases, without any fossil combustion taking place (case of use of fuel cells hydrogen).

Likewise, the applicants' experiments have shown that the destruction of atmospheric oxygen automatically causes an increase in the content of CO2 in the atmosphere by breaking the equilibrium which existed before the pre-industrial period between oxygen and CO2 from the air (to produce a given volume of CO2, a volume of oxygen equal to 1.5 to 2 times the volume of CO2 produced is destroyed in the air). This disruption of equilibrium is accentuated by two parallel phenomena: The overconsumption of oxygen linked to the use of oxygen in the air for the combustion of fossil fuels and non-fossil fuels, by a human population that has increased from 1 billion people before the industrial period to 7 billion now, on the one hand, and the destruction by humans of natural sources of oxygen production in the air (phytoplankton) on the other. Let us remind here that phytoplankton are responsible for the production of two-thirds of the oxygen we breathe and that the pollution of lakes, rivers, seas and oceans and the systematic destruction of phytoplankton that results from it is a major disaster that cannot be compensated for, even by the most ambitious of tree planting projects. We cannot do without phytoplankton.

Likewise, the applicants' experiments have shown the fact that when the oxygen concentration in the combustion gases of fossil fuels and non-fossil fuels increases (extensive use of excess pure oxygen in the combustion chambers), the content of CO2 in these combustion gases decreases. This CO2 level is almost zero when the oxygen concentration in the combustion gases is close to the oxygen concentration in atmospheric air (i.e. around 21%).

Trying to solve the problem of global warming by tackling only the minor cause of the release of carbon dioxide into the air does not lead to an expected positive result because the current technical solutions proposed by climate experts are not suitable and viable:

the abandonment of fossil fuels to avoid the formation of carbon dioxide has a very high economic and societal cost which prevents its implementation, the abandonment of fossil fuels in favor of electric batteries can cause the destruction of the sources of oxygen production on the earth by deforestation and the pollution of lakes, rivers and oceans during the extraction of minerals for the production of batteries, which will increase the greenhouse effect and global warming by automatically increasing the content of carbon dioxide in the air and destroying the ozone layer, the massive adoption of non-fossil fuels using oxygen from the air as an oxidizer (in the case of fuel cells and others) can cause a decrease in the concentration of oxygen in the air thus causing the increase in the greenhouse effect and global warming by automatically increasing the content of carbon dioxide in the air and by the destruction of the ozone layer. This abandonment can also lead to an increase in air temperature by very hot releases of combustion gases from non-fossil fuels containing large amounts of heat in the form of sensible heat and latent heat of vaporization of water.

On the basis of these observations, to reduce the increase in the temperature at the surface of the earth due to the increase in the concentration of carbon dioxide in the atmosphere of the earth, the applicant has carried out research which has resulted in a method for reducing the increase in temperature at the surface of the earth and the increase in the content of carbon dioxide in the atmosphere (A) due to combustion operations of fossil fuels and non-fossil fuels, remarkable in that it consists in reducing the increase in the temperature of the earth and the increase in the content of carbon dioxide in the atmosphere (A), which reductions in the temperature of the earth and the content of carbon dioxide are achieved by reducing the drop in oxygen content in the atmosphere, which reduction in the drop in oxygen content consists in:

Producing pure oxygen or producing hydrogen peroxide,

Using said oxygen or said hydrogen peroxide for the combustion of fossil fuels and non-fossil fuels, to reduce the consumption of oxygen contained in the air during said combustion operations.

In fact, by using synthetic oxygen produced and not extracted from existing air or from hydrogen peroxide for existing devices for which oxygen was hitherto necessary, the method avoids consuming oxygen from existing air and avoids the imbalance described above. The term content used can designate a volume concentration as well as a mass concentration.

No longer using air in the combustion of fossil fuels prevents the formation of NOx which is very toxic to human beings and which is responsible for acid rain and the disappearance of certain plant species on earth.

Oxygen can also be produced from hydrogen peroxide. This production can be done by the catalytic decomposition of hydrogen peroxide to produce oxygen and water. The produced water can be separated from the oxygen before the oxygen is introduced into the combustion chamber of fossil fuels and non-fossil fuels.

Oxygen can be produced by photosynthesis using phytoplankton (culture) and sunlight.

Hydrogen peroxide can also be introduced directly into the combustion chamber.

According to another particularly advantageous feature of the invention, the produced pure oxygen is diffused into the atmosphere at the place of its production and is recovered at another place for the purpose of combustion of said oxygen with fossil fuels and non-fossil fuels by extraction from the air. The method of the invention views the atmosphere as a giant tank and as a global distribution means in which additional oxygen is made in one place and is exploited in another place. It is therefore an extraction of oxygen from air into which the produced oxygen is injected at the scale of the atmosphere of the earth.

The applicant therefore devised a global principle of oxygen compensation: any oxygen used had to be produced and injected into the atmosphere beforehand.

According to another particularly advantageous feature of the invention, the method consists in using the oxygen or the peroxide produced as a complement, or as a complement and partial replacement, or as a complement and total replacement of the oxidizer (atmospheric air) for the combustion of fossil fuels and non-fossil fuels.

According to another particularly advantageous feature of the invention, the method consists in injecting the oxygen produced into a combustion chamber so as to maintain an oxygen content in the combustion gases at the outlet of the combustion chamber equal to that of the oxygen contained in the surrounding atmospheric air in which the combustion device is located or operates.

According to another particularly advantageous feature of the invention, the method consists in maintaining an oxygen content in the combustion gases at the outlet of the combustion equal to 21%.

According to another particularly advantageous feature of the invention, the method consists in maintaining an oxygen content in the combustion gases at the outlet of the combustion chamber of between 4 and 21%.

According to another particularly advantageous feature of the invention, the method consists in maintaining an oxygen content in the combustion gases at the outlet of the combustion chamber of between 2 and 21%.

According to another particularly advantageous feature of the invention, the method consists in maintaining an oxygen content in the combustion gases at the outlet of the combustion chamber of between 15 and 21%, According to another particularly advantageous feature of the invention, the method consists in maintaining an oxygen content in the combustion gases at the outlet of the combustion chamber of between 17 and 21%.

According to another particularly advantageous feature of the invention, the method is remarkable in that it consists in producing pure oxygen or hydrogen peroxide before its use in a combustion so that any consumption of oxygen is compensated beforehand by the production of oxygen or hydrogen peroxide.

For example, it is provided to produce an oxygen volume corresponding to 1.5 to 2 times the volume of carbon dioxide released.

According to another particularly advantageous feature of the invention, said extraction of oxygen is carried out by cryogenic cooling of the atmospheric air or by filtration of the atmospheric air on zeolite media or materials.

According to another particularly advantageous feature of the invention, pure oxygen is subjected before combustion to one of the following operations:
humidification with water,
mixing with dry water vapor.

According to another particularly advantageous feature of the invention, hydrogen peroxide is subjected before combustion to one of the following operations:
dissolving,
dissolving and mixing with water vapor.

According to another particularly advantageous feature of the invention, pure oxygen or hydrogen peroxide is produced from electrical energy from sustainable production means, green energies such as solar panels, wind turbines, the sun, hydraulic dams.

For example, the photolysis method can be exploited for this purpose.

According to another particularly advantageous feature of the invention, pure oxygen is produced from a culture of phytoplankton.

According to another particularly advantageous feature of the invention, oxygen is produced from hydrogen peroxide.

According to another particularly advantageous feature of the invention, pure oxygen is produced by catalytic decomposition of hydrogen peroxide to produce oxygen and water, the water being separable from the oxygen before introduction of oxygen into the combustion chamber.

As explained above, warming is not exclusively due to the decrease in the oxygen content in the air but also from rejection of high temperature combustion gases.

The use of produced pure oxygen has the advantage of avoiding the release not only of polluting gases such as nitrogen oxide (NOx) but also of rejecting hot nitrogen into the atmosphere.

According to another particularly advantageous feature of the invention, to reduce the increase in the temperature at the surface of the earth due to the release of hot gases into the atmosphere of the earth, the method is remarkable in that the combustion gases are cooled to temperatures such that the wavelength of infrared thermal radiation emitted at the cooling temperature does not correspond to the water vapor absorption wavelength or to the wavelength absorption of carbon dioxide to prevent them from heating the atmospheric air.

According to another particularly advantageous feature of the invention, the combustion gases are cooled so that the temperature of the cooled gases is below the temperature of the dew point of the hot gases so as to condense and remove the water vapor contained in these hot gases as well as their latent heat to prevent them from heating the atmospheric air. The immediate condensation prevents the transmission of heat by the gases.

The invention also relates to a device for carrying out the method described above.

According to the invention, the device is remarkable in that the hot combustion gases are cooled by means of one or more condensation heat exchangers:
- of the hot gas and air type with separated hot gas and air circuits and operating in counterflow or
- of the hot gas and liquid type with separated hot gas and liquid circuits and operating in counterflow or
- of the hot gas-liquid and air type with hot gas, liquid and air circuits separated from each other, the air circuit and the liquid circuit operating on the one hand in co-current with each other and on the other hand in counterflow with the hot gas circuit.

The wheeled or not-wheeled vehicles representing a significant source of hot gases with a significant quantity of heat in sensible form and in latent form (presence of water vapor) in the exhaust gases resulting from combustion, the invention also relates to a vehicle for carrying out the method.

This vehicle is a vehicle using an internal combustion engine and may in particular be:
- a vehicle traveling on the road such as a car or a truck,
- a train,
- a boat,
- etc. . . .

According to another particularly advantageous feature of the invention, the vehicle uses fossil fuel and air containing oxygen produced for the combustion of fossil fuel.

According to another particularly advantageous feature of the invention, the vehicle comprises a hot gas-air or hot gas-liquid or hot gas-liquid-air condensation heat exchanger comprising a condensate collector making it possible to collect the condensates whatever the inclination of the vehicle (uphill or downhill). In accordance with the method, this condensation heat exchanger provides cooling of the combustion gases, which cooling takes place so that the temperature of the cooled gases is below the dew point temperature of the hot gases so as to condense the water vapor contained in the combustion gases, and which cooling is carried out so that the temperature of the cooled gases is such that the wavelength of the infrared thermal radiation emitted by the cooled gases neither corresponds to the absorption wavelength of the water vapor nor to the absorption wavelength of carbon dioxide.

According to another particularly advantageous feature of the invention, the device is remarkable in that with regard to the direction of advance of the vehicle, the entry of hot gases to the volume of the exchanger is located downstream (at the rear of the vehicle) and the outlet of the cooled gases on the volume of the exchanger is located upstream.

According to another particularly advantageous feature of the invention, the vehicle uses fossil fuel and pure oxygen for the combustion of the fossil fuel.

According to another particularly advantageous feature of the invention, the vehicle uses non-fossil fuel and pure oxygen for the combustion of the non-fossil fuel.

According to another particularly advantageous feature of the invention, the vehicle uses fossil fuel and pure oxygen for the combustion of the fossil fuel.

According to another particularly advantageous feature of the invention, the vehicle is provided with a tank making it possible to store the cooled and freed of water vapor combustion gases and as they are produced and as the vehicle is in circulation.

According to another particularly advantageous feature of the invention, the storage tank for the cooled gases mainly composed of carbon dioxide is provided with one or more inlets for the inlet of the cooled gas, which inlets are provided with non-return valves and an outlet provided with an opening or closing means for withdrawing (discharging) the stored gas, which opening or closing means is manually, pneumatically or electrically controlled.

According to another particularly advantageous feature of the invention, the storage tank for cooled gases composed mainly of carbon dioxide contains one or more chemical reagents in solid and/or liquid form for dissolving and/or for chemical neutralizing carbon dioxide.

According to another particularly advantageous feature of the invention, the hot gas-air or hot gas-liquid or hot gas-liquid-air condensation heat exchanger is installed under the vehicle in a plane parallel to the vehicle floor.

According to another particularly advantageous feature of the invention, the hot gas-air or hot gas-liquid or hot gas-liquid-air condensation heat exchanger is installed under the vehicle in a plane parallel to the floor of the vehicle, and is provided with cooling fins whose plane is parallel to the direction of movement of the vehicle.

According to another particularly advantageous feature of the invention, the exchanger comprises gas inlet and outlet pipes and is equipped with one or more partitions separating the exchanger from said pipes. Such a feature avoids a direct exchange between the body of the pipes and the body of the exchanger.

According to another particularly advantageous feature, the method consists in:
1) Recovering the heat and water vapor contained in the combustion fumes of fossil fuels and non-fossil fuels from wheeled vehicles and/or flying vehicles and/or maritime vehicles and store this heat on these vehicles, which recovery of latent-type and/or sensitive-type heat from the combustion gases is carried out by cooling the combustion gases below their dew point, which cooling of the combustion gases is accomplished by heat exchange of the combustion fumes with an on-board coolant (LRE) stored on these vehicles through one or more combustion hot flue gas/liquid heat exchangers, which heat exchanger is a condensation-type heat exchanger.
2) Storing the heated liquid coolant (LRE) on the vehicle after heat exchange with the combustion fumes and after condensation of the water contained in these fumes
3) Recovering hot coolant (LRE) stored on the vehicle for use of the coolant itself or for the purpose of extracting heat from hot coolant (LRE).

According to one feature of the invention, the recovery of heat from the hot coolant (LRE) stored on the vehicle takes place by heat exchange between this hot coolant (LRE) and a cold gas or liquid through a heat exchanger (ECF) located or not inside the hot liquid storage vessel, which heat exchange takes place by circulating the cold gas (GF) or the cold liquid (LF), the temperature of which is lower than the temperature of the hot coolant (LRE) and which circulation of the cold gas or liquid causes the cooling of the hot coolant (LRE).

According to another feature of the invention, the coolant is water.

According to another feature of the invention, demineralized water can be injected into the combustion fumes before the entry of these combustion fumes into the condensation heat exchanger. The advantage of this injection of demineralized water is on the one hand to reduce the temperature of the combustion fumes by evaporation of demineralized water, on the other hand to increase the water vapor content in the combustion fumes, which water vapor, once condensed in the condensation heat exchanger, further reduces the CO2, NOx and microparticles contained in the combustion fumes. The fact of using demineralized water for injection into the combustion fumes instead of raw water containing minerals makes it possible to avoid the deposit of minerals in the combustion fume circuit and in the condensation heat exchanger.

According to another feature of the invention, the vehicle comprises an on-board device for producing demineralized water from raw water which is itself on board the vehicle.

According to another feature of the invention, the water resulting from the condensation of the steam is recovered and then treated so as to neutralize its acidity.

According to another feature of the invention, pure oxygen can be produced from hydrogen peroxide.

According to another feature of the invention, the circuit for recovering the heat and water vapor from the combustion fumes comprises 2 circuits:
  A primary circuit operating in a closed circuit and containing a first coolant which recovers the heat from the combustion fumes through a condensation heat exchanger,
  A second open or semi-open or closed circuit containing a second coolant which recovers the heat contained in the first coolant contained in the primary circuit through another heat exchanger.

According to another feature of the invention, the first coolant and the second coolant are identical.

According to another feature of the invention, the first coolant is water.

According to another feature of the invention, the second coolant is water.

According to another feature of the invention, the method can be applied to land vehicles (cars, trucks, trains), boats, flying vehicles, thermal power plants, nuclear power plants or any facility which releases heat and/or steam.

According to another feature of the invention, the cooled gases can be stored in situ in a storage tank.

According to another feature of the invention, the heat stored in the hot coolant can be recovered once the land, air or sea vehicle has arrived at its parking point or stopping point.

According to another feature of the invention, the coolant contains chemical substances to prevent the liquid from freezing when the weather is cold.

According to another feature of the invention, the liquid to be heated (LF) can be water.

According to another feature of the invention, the liquid to be heated (LF) can be water and can be intended for household or industrial uses.

According to another feature of the invention, the gas to be heated (LF) can be air.

According to another feature of the invention, the airtight, sealed and isothermal (RT) container is a rotary heat accumulator.

According to another feature of the invention, the airtight, sealed and isothermal (RT) container is a static heat accumulator.

According to another particularly advantageous feature of the invention, the method is remarkable in that it consists in:
  1) Reducing the decrease in the oxygen content in the atmosphere by production and/or use, for the combustion of fossil fuels and non-fossil fuels, of pure oxygen produced from renewable energies such as wind turbines, solar energy, solar panels and hydroelectricity.
  2) Recovering the heat and water vapor contained in the combustion fumes of fossil fuels and non-fossil fuels and store this heat, which recovery of latent-type and/or sensitive-type heat from combustion gases is carried out by cooling the combustion gases below their dew point, which cooling of the combustion gases is carried out by melting hot-melt chemical substances (SCT) of organic type or of a mineral type or of organic and mineral type contained in one or more airtight, sealed and isothermal (RT) containers and whose melting temperature is below the dew point of the combustion gases, which melt takes place by heat exchange between the hot gases resulting from the combustion of fossil fuels and non-fossil fuels and the hot-melt chemical substances (SCT) through an heat exchanger (ECC) mounted inside the container (RT) containing the hot-melt chemical substances (SCT),
  3) Recovering the heat stored in the molten hot-melt chemical substances (SCTs) by heat exchange between these melted chemical substances and a cold gas or liquid through a heat exchanger (ECF) located inside the container (RT) storing the melted and not melted chemical substances, which heat exchange takes place by recovering the latent heat of melting of hot-melt chemical substances (SCT) by circulating the cold gas (GF) or the cold liquid (LF), the temperature of which is lower than the melting temperature of the chemical substances inside said heat exchanger (ECF) and which circulation of the cold gas or liquid causes recrystallization or solidification of the hot-melt chemical substances (SCT).

According to another feature of the invention, step 3 of the method takes place after step 2 and these steps are not carried out simultaneously.

According to another feature of the invention, the method may include only steps 2 and 3.

According to another feature of the invention, a cooled and freed of water vapor portion of the combustion gases is recycled and then mixed with pure oxygen for the introduction of this mixture into the combustion chamber of the fossil fuels and non-fossil fuels.

According to another feature of the invention, all of the cooled and freed of water vapor combustion gases are filtered through filters containing chemical substances such as $LiHO_2$, $LiO_2$, $NaHO_2$, $KHO_2$, $NaOH$, $H_2O_2$, $K_2O_2$, $LiOH$, $KOH$ then part of the cooled and filtered gases is recycled, then mixed with pure oxygen for introduction of this mixture into the combustion chamber of the fossil fuels and non-fossil fuels.

According to another feature of the invention, a cooled and freed of water vapor portion of the combustion gases is not recycled then is filtered through filters containing chemical substances such as $LiHO_2$, $LiO_2$, $NaHO_2$, $KHO_2$, $NaOH$, $H_2O_2$, $K_2O_2$, $LiOH$, $KOH$ before being released into the atmosphere.

According to another feature of the invention, a cooled and freed of water vapor portion of the combustion gases is recycled and then mixed with pure oxygen for introduction of this mixture into the combustion chamber of the fossil fuels and non-fossil fuels and in order to maintain an oxygen content in the combustion gases at the combustion outlet of between 4 and 21%, and preferably in this range, of between 2 and 21%, and preferably in this range, of between 15 and 21%, and preferably in this range, of between 17 and 21%.

According to another feature of the invention, the water resulting from the condensation of the steam is recovered and then treated in order to neutralize its acidity.

According to another feature of the invention, pure oxygen can be produced from hydrogen peroxide.

According to another feature of the invention, hydrogen peroxide can be used directly in place of pure oxygen.

According to another feature of the invention, hydrogen peroxide can be produced from green energies such as wind turbines, solar energy, solar panels and hydroelectricity.

According to another feature of the invention, the method can be applied to land vehicles (cars, trucks, trains), boats, flying vehicles, thermal power plants, nuclear power plants or any facility which releases heat and/or steam.

According to another feature of the invention, the cooled gases can be stored in situ in a storage tank.

According to another feature of the invention, the heat stored in the hot-melt chemical substances (SCT) can be recovered once the land, air or sea vehicle has arrived at its parking point or stopping point.

According to another feature of the invention, the container (RT) contains in addition to the hot-melt chemical substances (SCT) other substances making it possible to prevent supercooling of the chemical substances (SCT).

According to another feature of the invention, the substances which make it possible to prevent the supercooling of the hot-melt chemical substances are intimately mixed with these hot-melt substances (SCT).

According to another feature of the invention, the substances which make it possible to prevent supercooling of the hot-melt chemical substances are not hot-melt.

According to another feature of the invention, the hot-melt chemical substances (SCT) have a melting point of between 20 and 55° C. or of between 55 and 70° C. or of between 70 and 85° C. or of between 85 and 100° C.

According to another feature of the invention, the hot-melt chemical substances (SCT) have a latent heat of fusion of between 1 and 10 kWh/m3 or of between 10 and 50 kWh/m3 or of between 50 and 100 kWh/m3 or of between 100 and 150 kWh/m3 or of between 150 and 200 kWh/m3 or of between 200 and 250 kWh/m3 or of between 250 and 300 kWh/m3.

According to another feature of the invention, the liquid to be heated (LF) can be water.

According to another feature of the invention, the liquid to be heated (LF) can be water and can be intended for household or industrial uses.

According to another feature of the invention, the gas to be heated (LF) can be air.

According to another feature of the invention, the airtight, sealed and isothermal (RT) container is a rotary heat accumulator.

According to another feature of the invention, the hermetic, sealed and isothermal (RT) container is a static heat accumulator.

The invention also relates to a maintenance or service plant, allowing to operate the vehicle. According to the invention, this plant comprises a plurality of reservoirs associated with pipes capable of simultaneously connecting to the vehicle, with
 a reservoir of fossil or non-fossil fuel to supply the vehicle tank,
 a discharging reservoir for discharging the gas storage tank fitted to the vehicle.

When the vehicle includes a tank of hydrogen peroxide or oxygen, the plant further includes a reservoir of produced oxygen or of produced hydrogen peroxide to supply the tank of the vehicle with produced oxygen or hydrogen peroxide.

The fundamental concepts of the invention having just been explained above in their most elementary form, other details and characteristics will emerge more clearly on reading the following description and with reference to the accompanying drawings, providing by way of non-limiting example, several embodiments of a method, a device, a vehicle and a plant in accordance with the invention.

DESCRIPTION OF THE PREFERRED EMBODIMENTS

Figure 1:
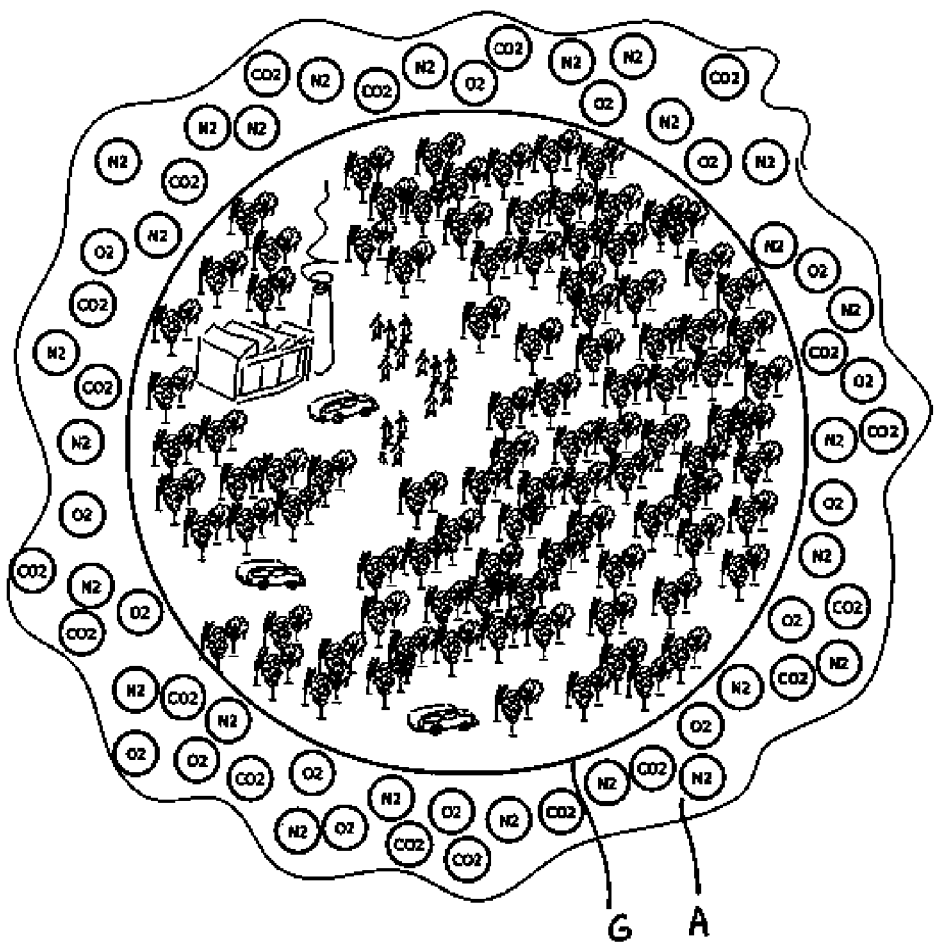
FIG. 1 is a schematic representation of a previous situation of the earth and its atmosphere.

As illustrated in the drawing of FIG. 1, the earth housing the forest coverage, factories, cars and human population is denoted G. The atmosphere is denoted A and is illustrated with its main elements represented within circles:
dinitrogen=>N2 circles,
dioxygen=>O2 circles,
carbon dioxide=>CO2 circles.

This drawing depicts the situation at the beginning of the development of internal combustion vehicles, where there was a greater presence of forest coverage, very few factories, very few cars and a small human population. There was also a very significant presence (not shown) of phytoplankton.

Figure 2:
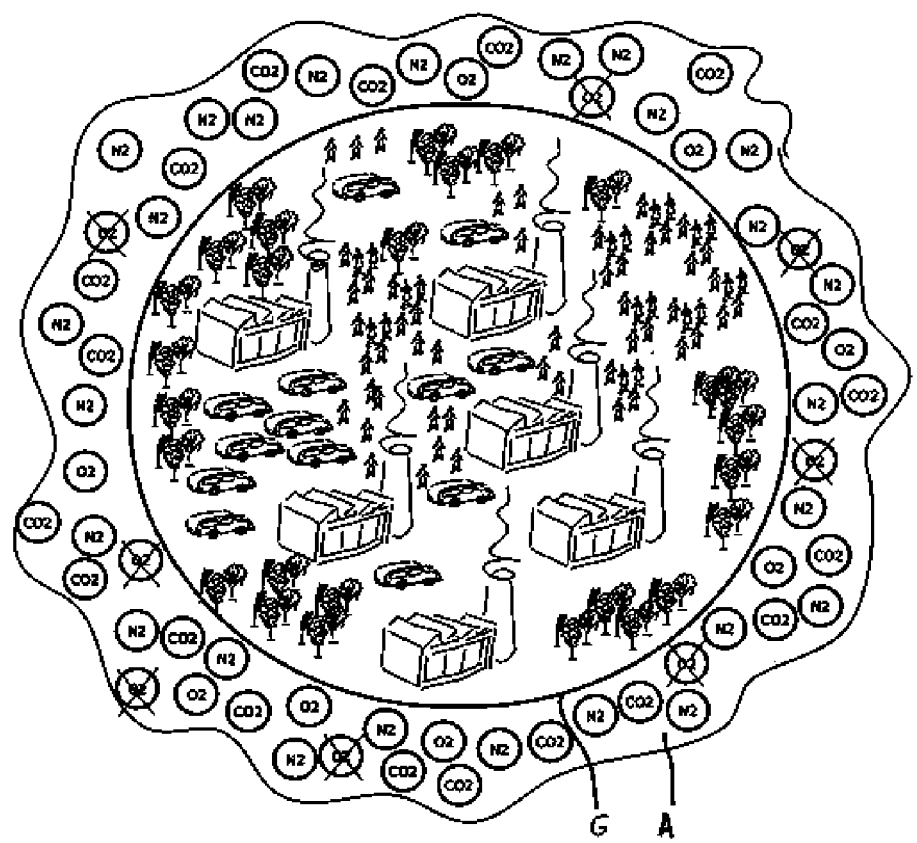
FIG. 2 is a schematic representation of the current situation of the earth and its atmosphere.

The drawing in FIG. 2 illustrates the current situation of the earth G and the atmosphere A with a significant loss of forest coverage, a lot of factories, a lot of cars and a large human population. There are less and less phytoplankton (not shown). A decrease in oxygen in the atmosphere of the earth is to be noted.

Figure 3:
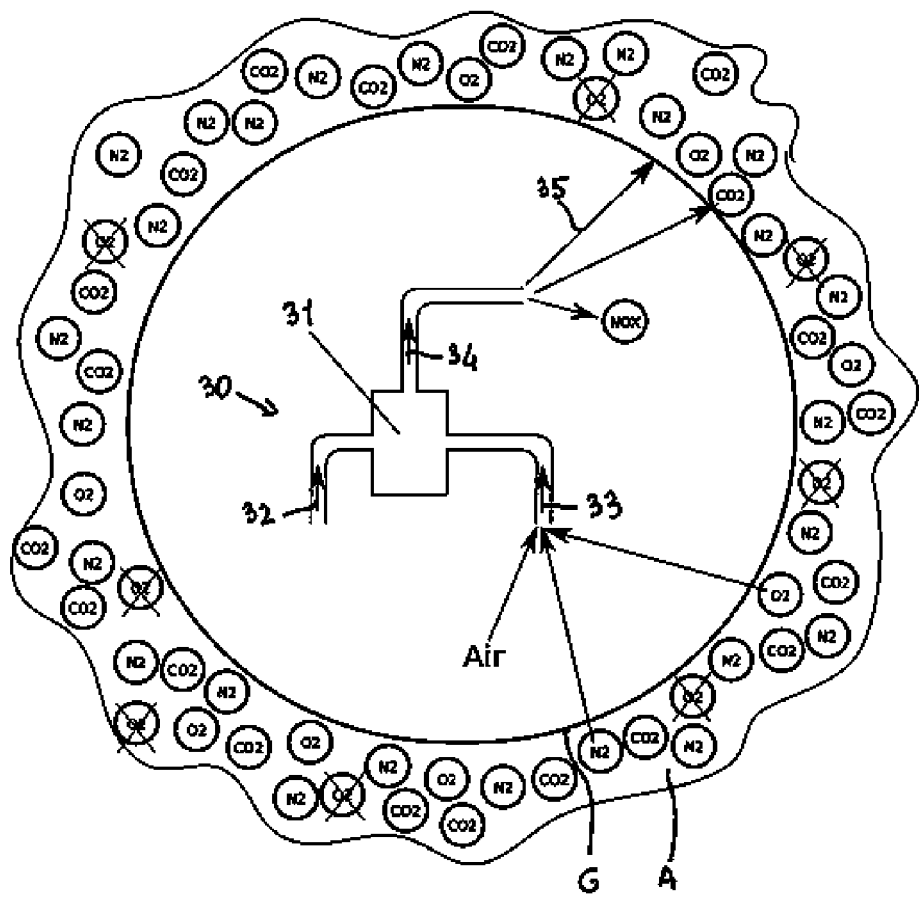
FIG. 3 is a schematic representation of an exemplary mode of burning fossil fuels of the prior art.

The drawing of FIG. 3 illustrates the current mode of combustion of fossil fuels by using air from the atmosphere A. The furnace denoted 30 positioned on the earth G comprises a combustion chamber 31 supplied with fossil fuel (arrow 32) and by air (arrow 33) from atmosphere A, i.e. in particular by a mixture of dinitrogen N2 and dioxygen O2. The releases (arrows 34) are hot gases which in particular include carbon dioxide and nitrogen oxide NOx. The releases of steam and hot nitrogen are shown by arrow 35.

The consequences of using this type of combustion are:
a reduction in the oxygen content in the atmosphere A of the earth,
heating by injecting hot gases into the atmosphere A of the earth (including hot nitrogen), and
production of harmful substances such as NOx.

Figure 4:
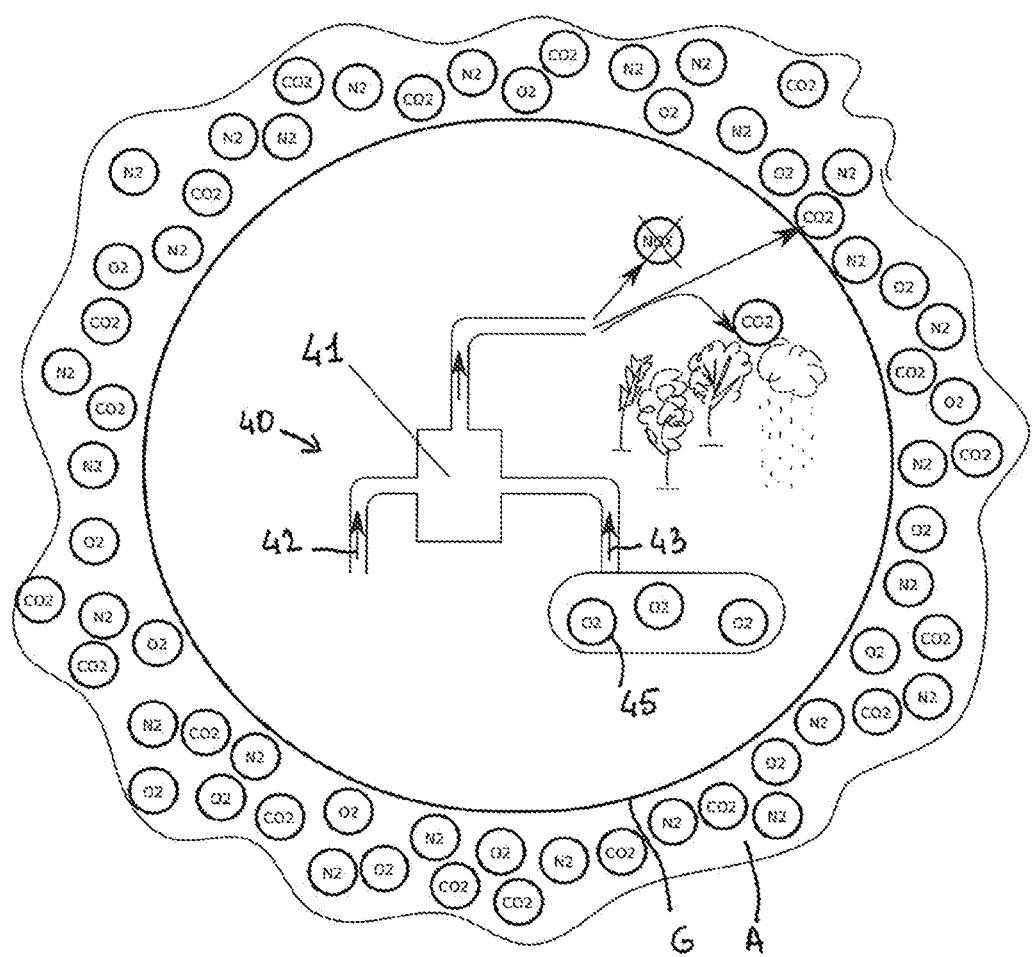
FIG. 4 is a presentation of an exemplary mode of combustion of fossil fuels according to the invention with the use of produced oxygen instead of atmospheric air.

FIG. 4 illustrates one of the technical solutions of the invention for the purpose of preserving the oxygen content of the air in atmosphere A consisting in using a furnace 40 with a combustion chamber 41 receiving a fossil fuel (arrow 42) and produced pure oxygen 45 intended for its injection (arrow 43) into the combustion chamber 41 of the furnace 40. In comparison with the drawing of FIG. 3, an absence of production of NOx and a higher presence of oxygen in the atmosphere A of the earth and a reduction in the concentration of carbon dioxide in the atmosphere of the earth is to be noted, since oxygen in the air is no longer consumed. The use of pure oxygen also avoids the release of hot nitrogen.

As described above, oxygen can be produced and injected directly into said furnace, engine, etc. or be produced to compensate for that used elsewhere.

Figure 5:
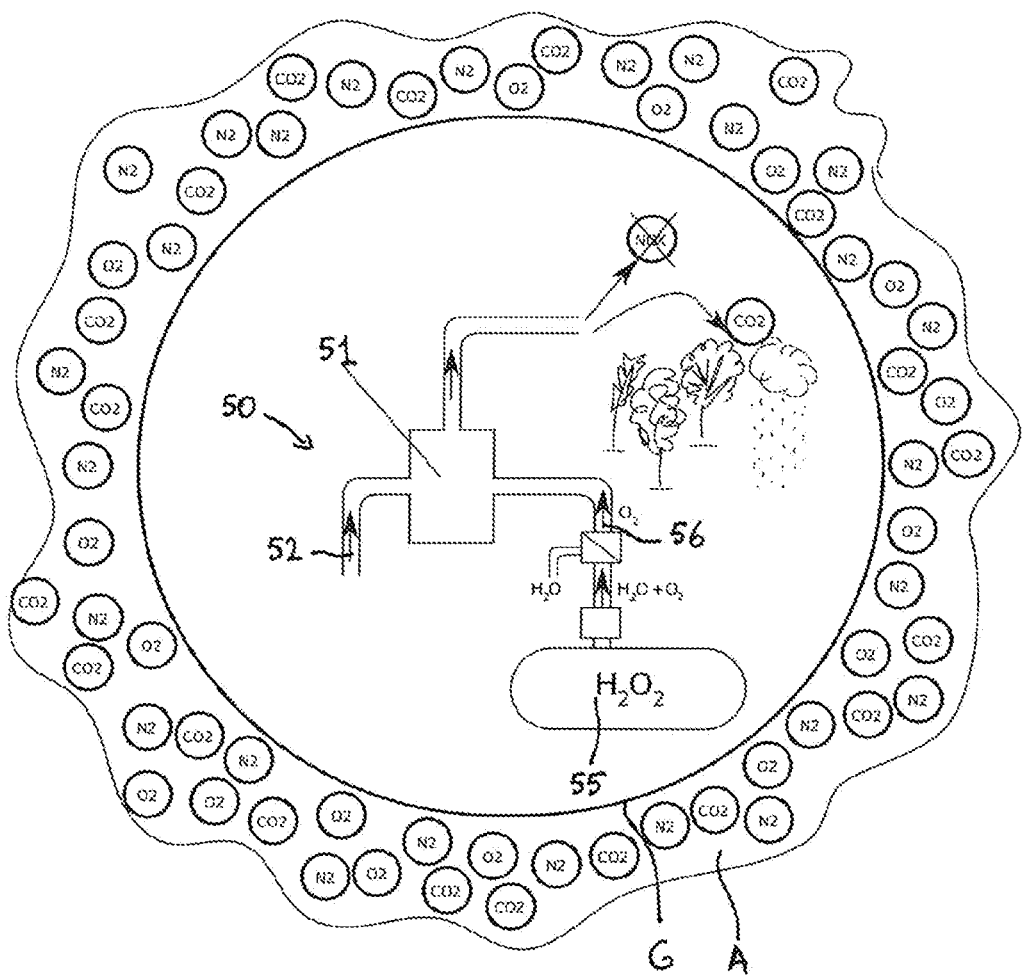
FIG. 5 is a presentation of an exemplary mode of combustion of fossil fuels according to the invention with the use of produced hydrogen peroxide instead of atmospheric air.
Figure 6:
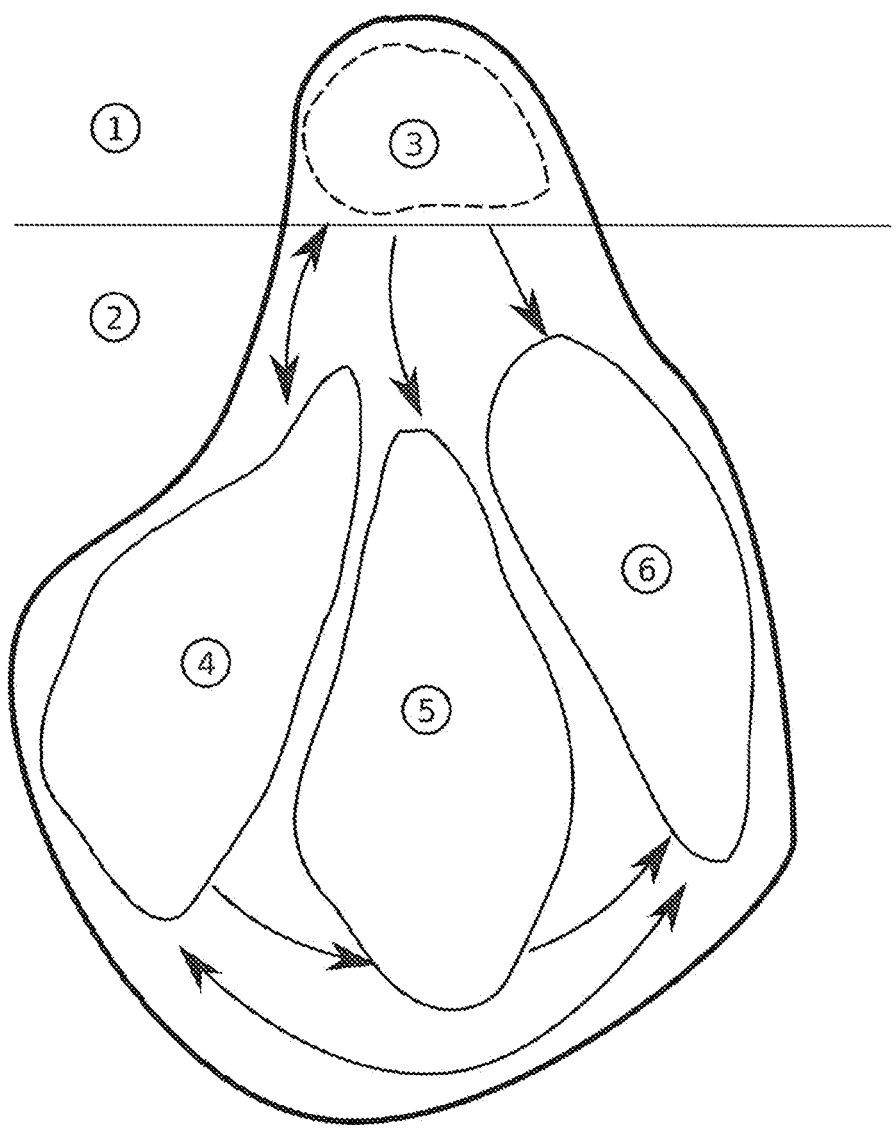
FIG. 6 is a presentation illustrating, according to the Iceberg model, the diagnosis of the causes of global warming which led to the invention.

FIG. 5 illustrates another of the technical solutions of the invention for the purpose of preserving the oxygen content of the air of the atmosphere A consisting in using a hearth 50 with a combustion chamber 51 receiving a fossil fuel (arrow 52) and pure oxygen 56 resulting from the decomposition of hydrogen peroxide 55 produced. Here too, in comparison with the drawing in FIG. 3, an absence of production of NOx and a greater presence of oxygen in the atmosphere A of the earth and a reduction in the concentration of carbon dioxide in the atmosphere of the earth can be noted, since the oxygen in the air is no longer consumed. The use of pure oxygen also avoids the release of hot nitrogen.

Figure 7A:
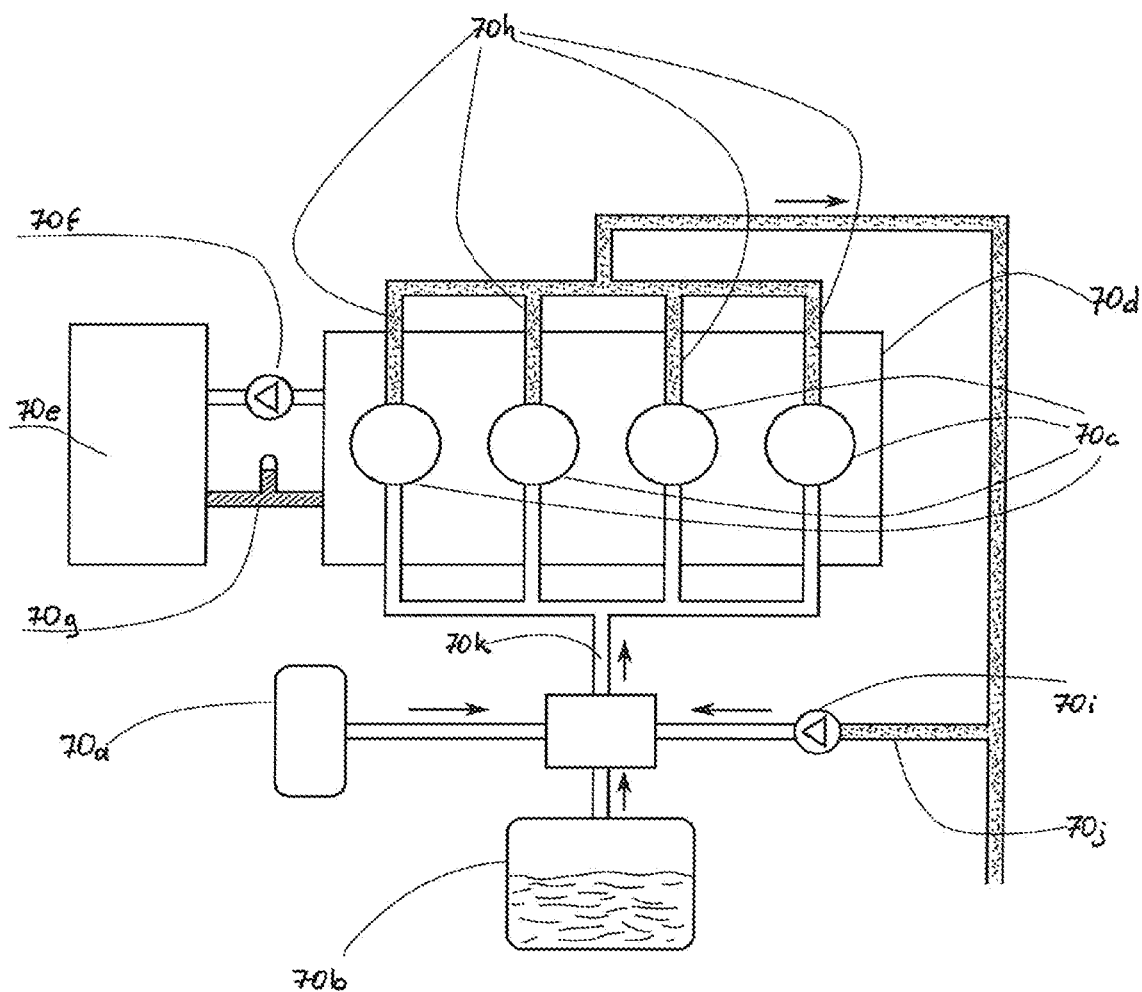
FIG. 7a is a schematic drawing of an embodiment of a vehicle engine using combustion with pure oxygen.

FIG. 7a illustrates one embodiment of an engine 70d using pure oxygen. As illustrated, this engine 70d includes a combustion chamber 70c supplied with oxygen from a pure oxygen tank 70a and with fossil fuel from a fossil fuel tank 70b. A heat exchanger 70e ensures the cooling of the engine 70d. A pump 70f ensures the displacement of the coolant 70g.

According to a possible option, the hot gases 70h resulting from the combustion are recycled (through the pump 70i) to be mixed with the fossil fuel/pure oxygen mixture and to be injected (reference 70k) into the engine 70d for the purpose of combustion optimization.

To avoid damaging engine parts, the cooling capacity of the heat exchanger 70e is significantly greater (up to twice) than the capacity of heat exchangers of current common vehicles. As a result, the pump 70i is also of higher capacity than current pumps.

Figure 7B:
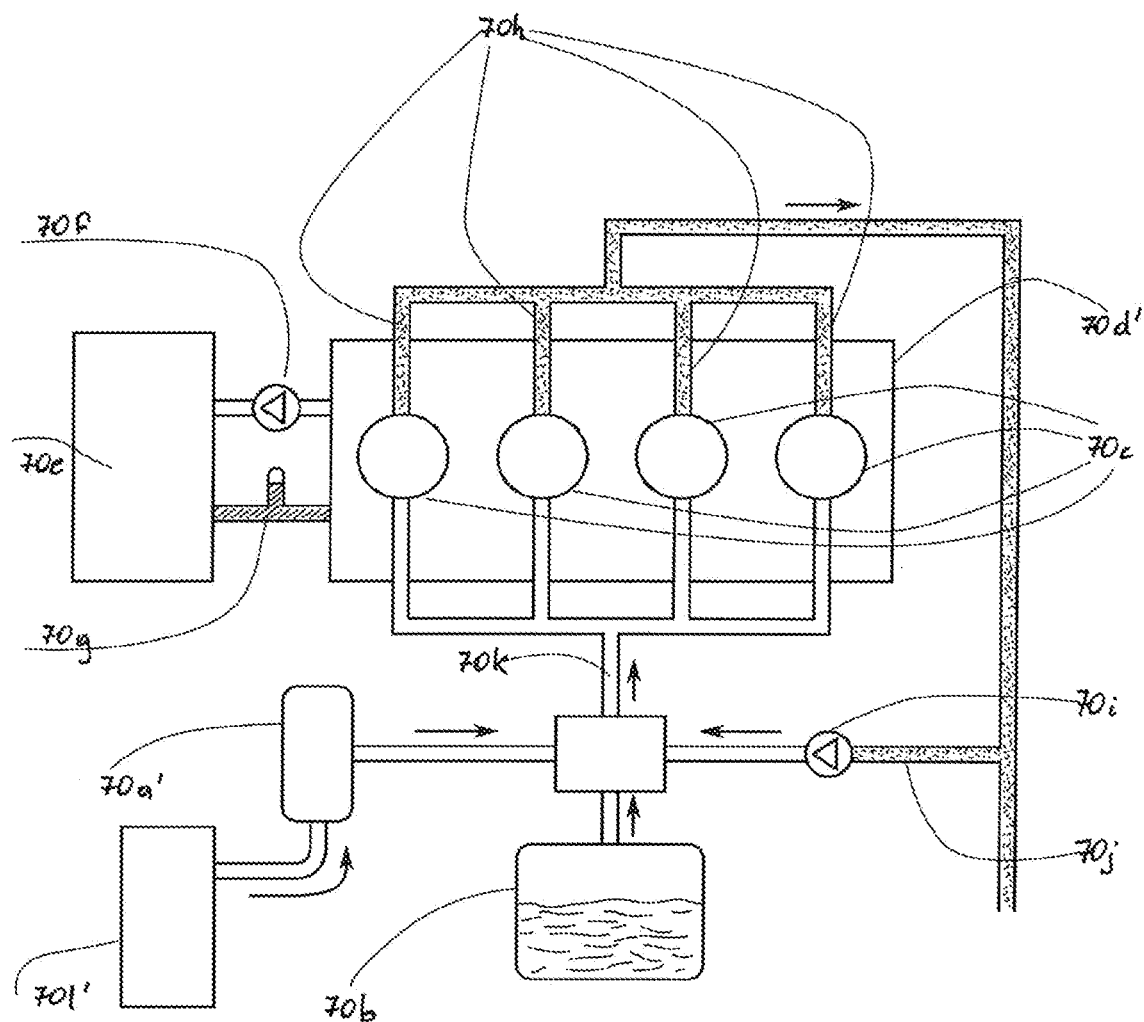
FIG. 7b is a schematic drawing of an embodiment of a vehicle engine using combustion with oxygen extracted from atmospheric air.

FIG. 7b illustrates one embodiment of an engine 70d' using oxygen extracted from atmospheric air. According to the invention, this embodiment is associated with a compensation of pure oxygen produced remotely. It uses the various elements of the engine 70d illustrated by the drawing of FIG. 7a. Compared with the embodiment illustrated by the drawing of FIG. 7a, it differs from the latter in that it is equipped, upstream the pure oxygen tank 70a', with an extractor of the oxygen from the air 70l'.

Figure 7C:
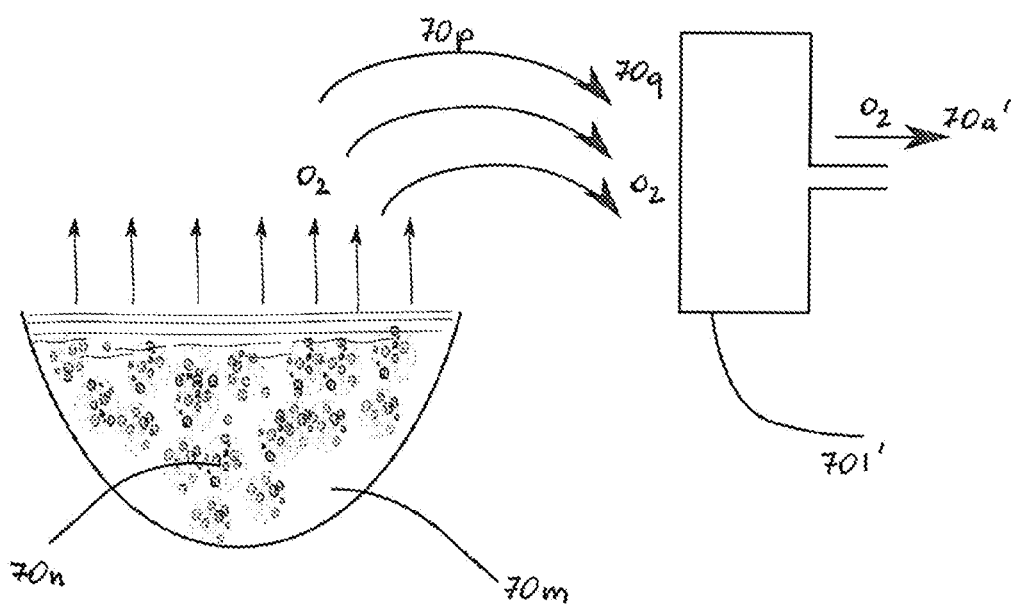
FIG. 7c is a presentation of a production/compensation mode capable of powering the motor of FIG. 7b.

FIG. 7c illustrates one embodiment of oxygen production or compensation that may be associated with the operation of engine 70d' described above. This embodiment comprises the following steps:
a step of production of oxygen ($O_2$) by the culture of phytoplankton 70n in oceans, seas, rivers, lakes (denoted 70m),
a step of rejecting this oxygen produced by phytoplankton 70n in the atmosphere of the earth 70p and,
a step of extracting this oxygen ($O_2$) in the atmospheric air 70q by means of an extractor 70l' illustrated in the drawing of FIG. 7b, and of sending this extracted oxygen ($O_2$) to the storage tank 70a'.

This same Figure can be used as an illustration for another embodiment of which the only difference lies in the fact that the production of oxygen takes place by electrolysis of water by solar means (photolysis) and not by culture of phytoplankton.

Figure 8:
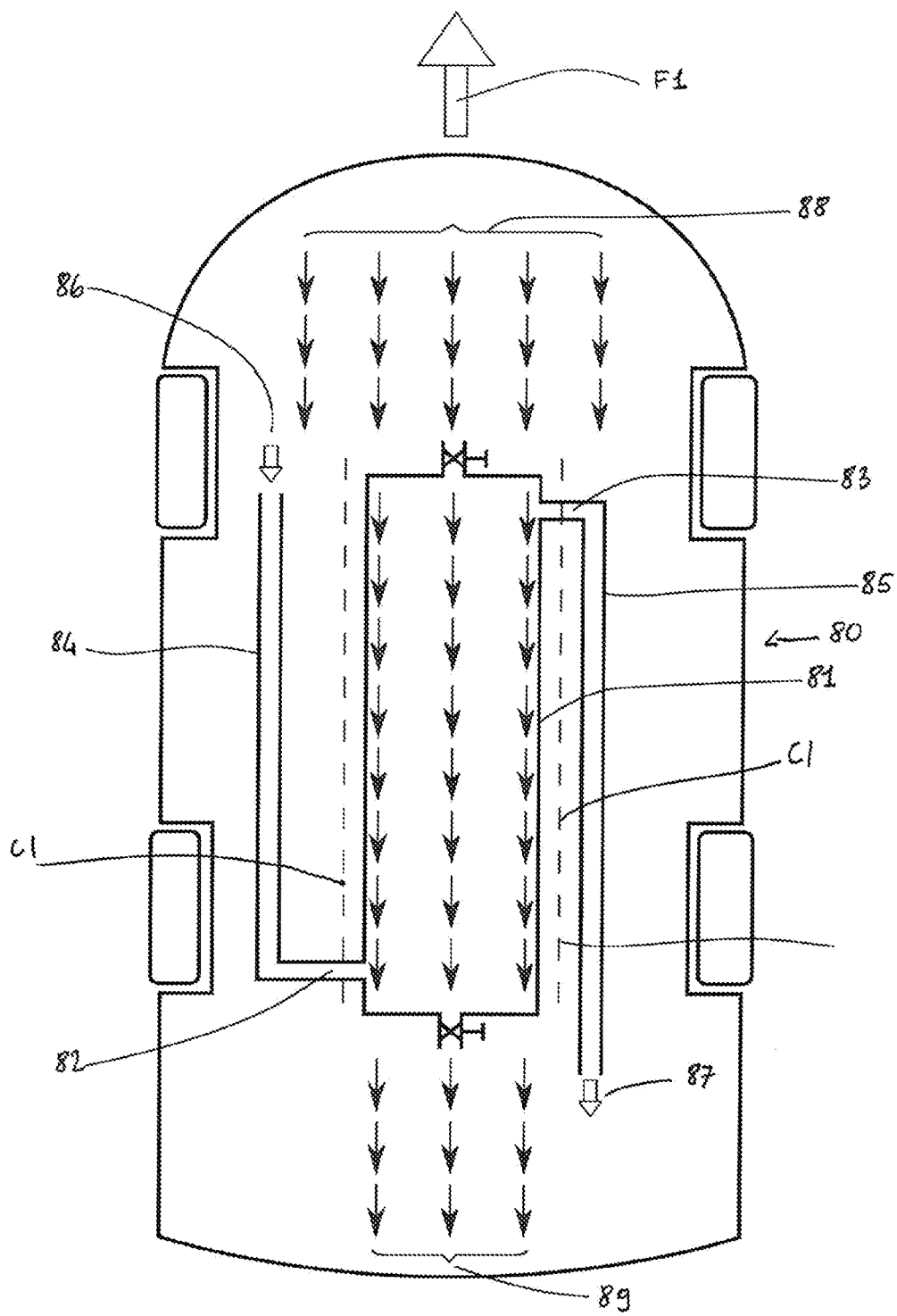
FIG. 8 is a schematic drawing of a wheeled vehicle equipped with a combustion gas cooling device.

The drawing of FIG. 8 illustrates an implementation of the cooling of combustion gases participating in the operation of a wheeled vehicle denoted 80.

FIG. 8 illustrates a combustion gas cooling device participating in the operation of a wheeled vehicle denoted 80 as a whole. This device comprises a hot gas-air condensation heat exchanger 81 which receives through the inlet 82 hot combustion gases which exit once cooled through the outlet 83. The device comprises a supply pipe 84 for hot combustion gases 86 from the engine of the vehicle 80 to the heat exchanger 81 and an outlet pipe 85 for the cooled combustion gases 87, freed of water vapor, returned to the rear of the vehicle 80. The cooling air 88 is received at the front of the vehicle 80 during the movement of the latter (arrow F1). The air 89 having served for cooling the combustion gases and for condensing the water vapor contained in these gases is discharged at the rear of the vehicle 80. However, as illustrated, the inlet 82 for the hot combustion gases is located on the rear part of the exchanger 81 while the outlet 83 of the cooled gases is arranged at the front of the exchanger 81. The enclosure formed by the exchanger 81 is also equipped with means for discharging the condensates represented by taps. Partitions denoted CI separate the pipes 84 and 85 from the body of the exchanger 81 to avoid a direct exchange between the pipes and the exchanger.

Figure 9:
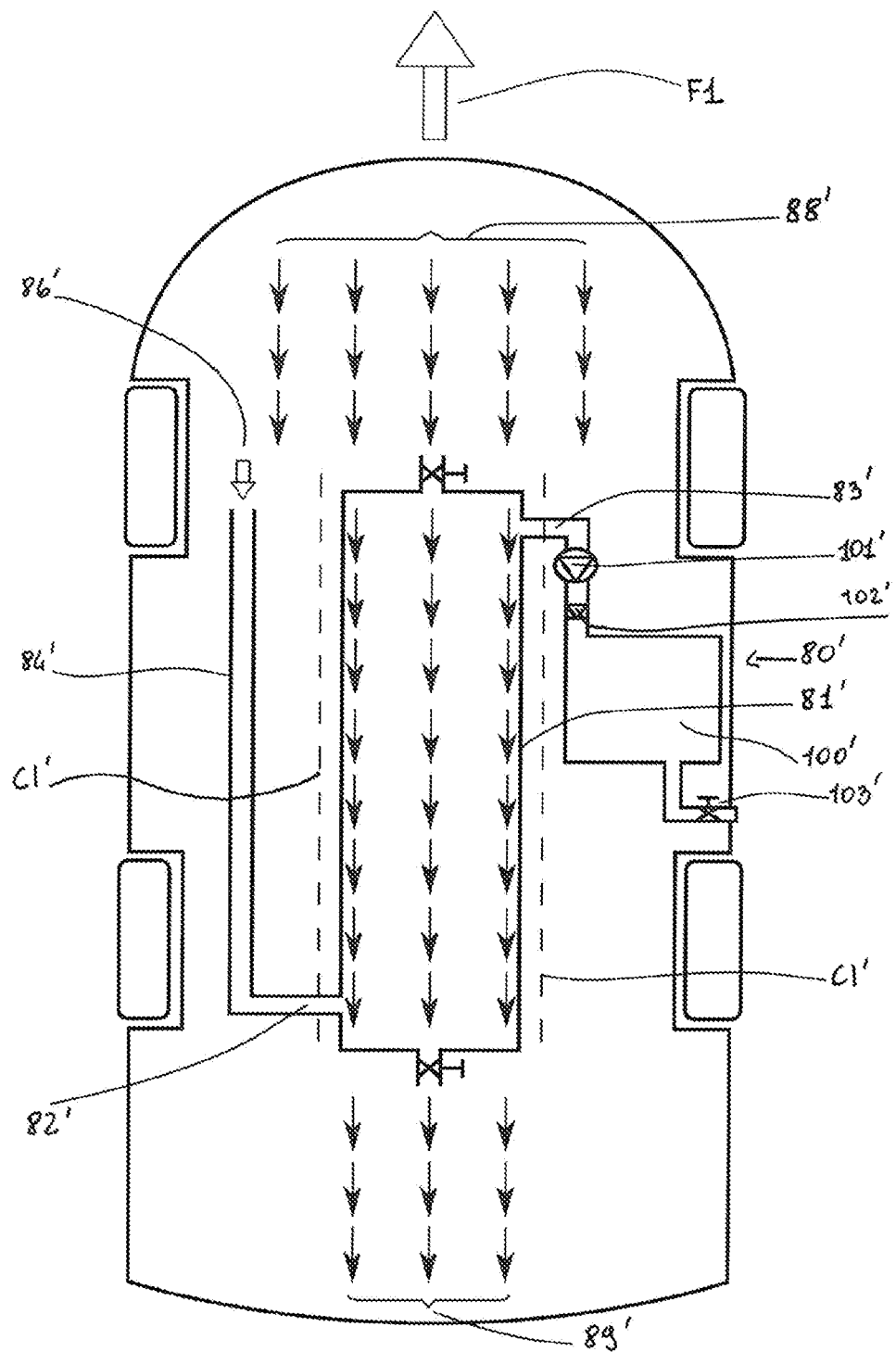
FIG. 9 is a schematic drawing of the vehicle of FIG. 8 with storage of cooled combustion gases.

FIG. 9 illustrates a vehicle 80' equipped with a combustion gas cooling device participating in the operation of the vehicle equivalent to that illustrated in the drawing of FIG. 8 but with the specific feature of storing the cooled exhaust gases. To do this, the vehicle 80' is equipped with a sub-assembly for recovering said cooled gases. Thus, the outlet 83' of the exchanger 81' leads to a storage tank 100' for the cooled combustion gases. A compression pump 101' and a non-return valve 102' controls the filling of this volume from the outlet 83'. A valve 103' controls the discharging of said tank 100'. As an alternative or in addition to the concentration, said storage tank contains one or more chemical reagents in solid and/or liquid form for dissolving and or chemically neutralizing CO2. This embodiment is also equipped with partitions, here denoted CI'.

Figure 10A:
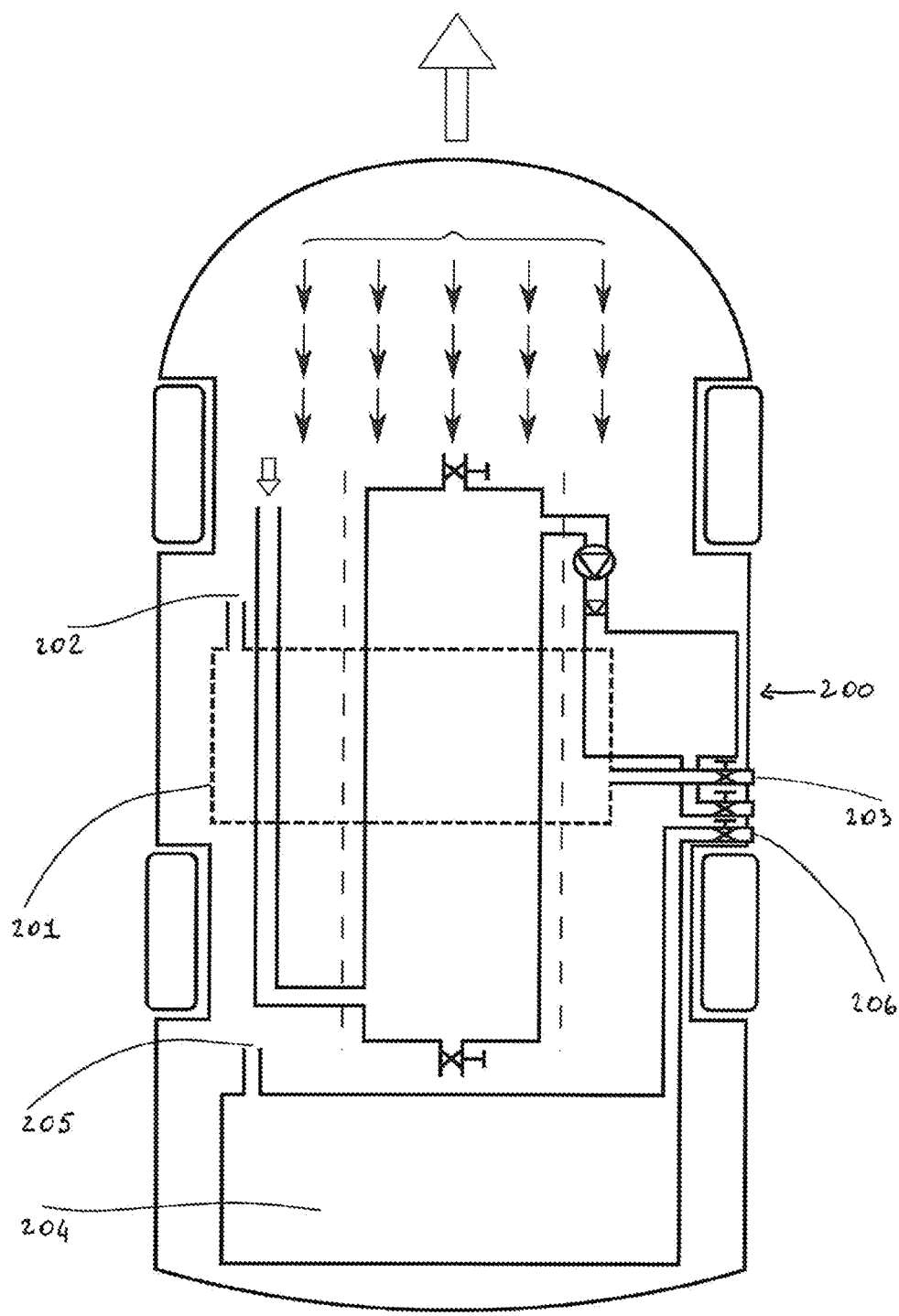
FIG. 10a is a schematic drawing of a vehicle using pure oxygen for the combustion of fuels with cooling of the combustion gases and storage of the cooled combustion gases.

The vehicle 200 illustrated by the drawing of FIG. 10a comprises the means for cooling and storing the combustion gases of the vehicle 80' of FIG. 9 with in addition means for filling with pure oxygen, with fuel, and for discharging the stored combustion gases. Thus, in addition to the various sub-assemblies described for the vehicle 80', this vehicle 200 comprises a pure oxygen tank 201 with a starting line 202 towards the engine (not shown) of the vehicle 200 and a filling line 203 emerging on the outside. The fuel tank is here denoted 204 with a starting line 205 to the engine (not shown) of the vehicle 200 and a filling line 206 emerging to the outside. According to the non-limiting embodiment illustrated, the fuel and oxygen inlets and the outlet of the sequestered gases are grouped together in proximity to each other. Such a configuration will make it possible to group together the operations of filling and discharging the vehicle.

Figure 10B:
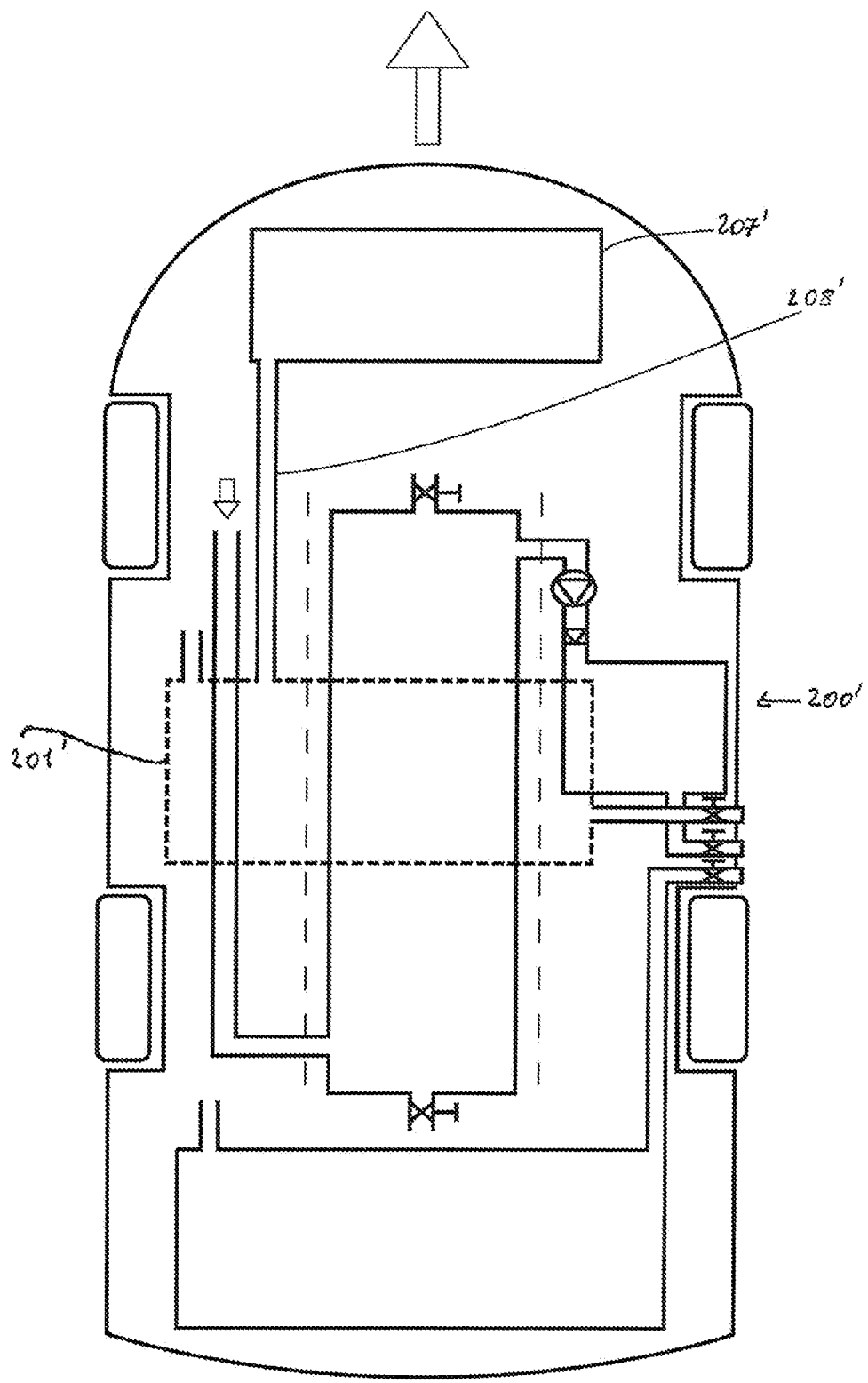
FIG. 10b is a schematic drawing of a vehicle equivalent to that of FIG. 10a and equipped with means for extracting oxygen from the air to fuel the combustion.

The drawing of FIG. 10b illustrates a vehicle 200' equivalent to that denoted 200 illustrated by FIG. 10a but which is equipped with a means for extracting oxygen from the air. Thus, in addition to the various sub-assemblies described for the vehicle 200, this vehicle 200' comprises an oxygen extractor 207' for extracting oxygen from the air with a pipe 208' ensuring the connection between the oxygen extractor 207' and the oxygen tank 201'.

Figure 11A:
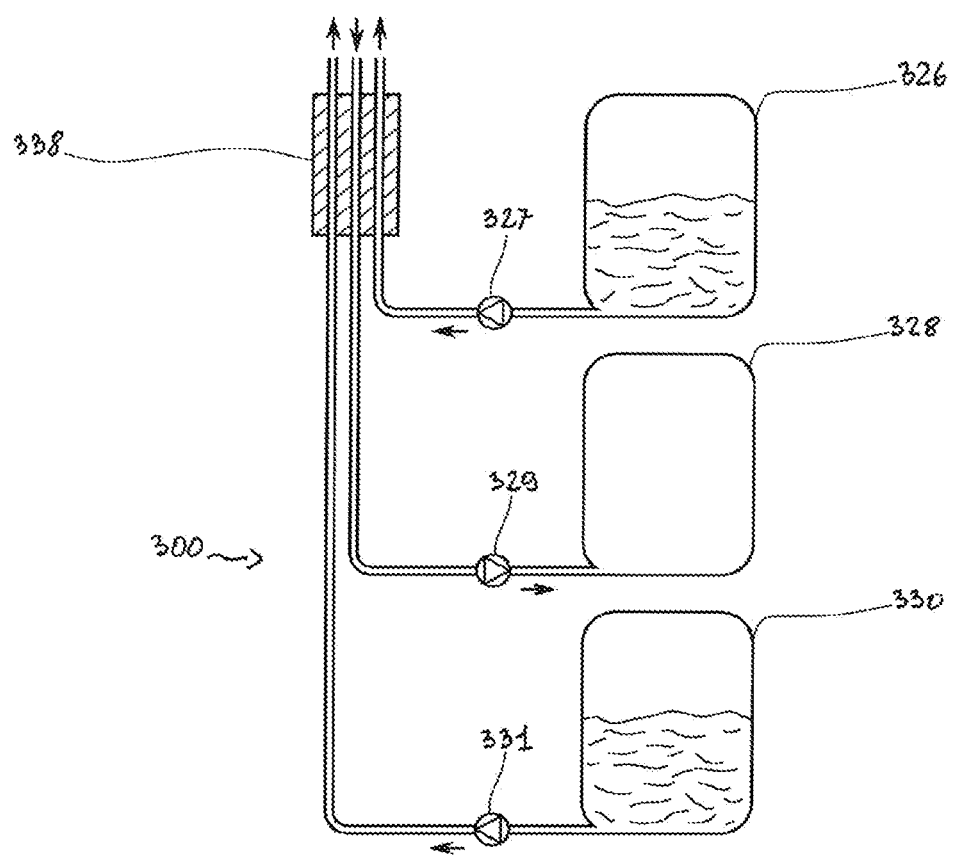
FIG. 11a is a schematic drawing of an oxygen and fuel filling plant and discharge of the combustion gases from the vehicle.

FIG. 11a illustrates an embodiment of a plant denoted 300 which comprises three tanks associated with pumps in order to manage the supply of fuel, oxygen and the recovery of exhaust gases. The plant 300 thus comprises a liquid oxygen reservoir 326 associated with a liquid oxygen pump 327 for filling the vehicle with oxygen (not shown but corresponding to that equipped with a fuel tank, an oxygen tank and gas storage tank). The plant 300 also includes a combustion gas storage tank 328 associated with a pump 329 for withdrawing the combustion gases stored in the vehicle tank. This pump 329 also serves as a compressor.

The plant finally comprises a reservoir 330 of liquid or gaseous fuel associated with a pump 331 for filling the vehicle with liquid or gaseous fuel. Each tank or reservoir is equipped with a pipe to which is connected the pump with which they are associated.

The ends of these pipes are assembled and each equipped with an end fitting capable to be connected, so as to connect with the inlets and outlets of the vehicle, for example for the vehicle 200 of FIG. 10a. The end fittings are assembled on a service gun 338 allowing a user to manipulate the three nozzles simultaneously when filling the fuel and oxygen tanks and when discharging the gases.

Figure 11B:
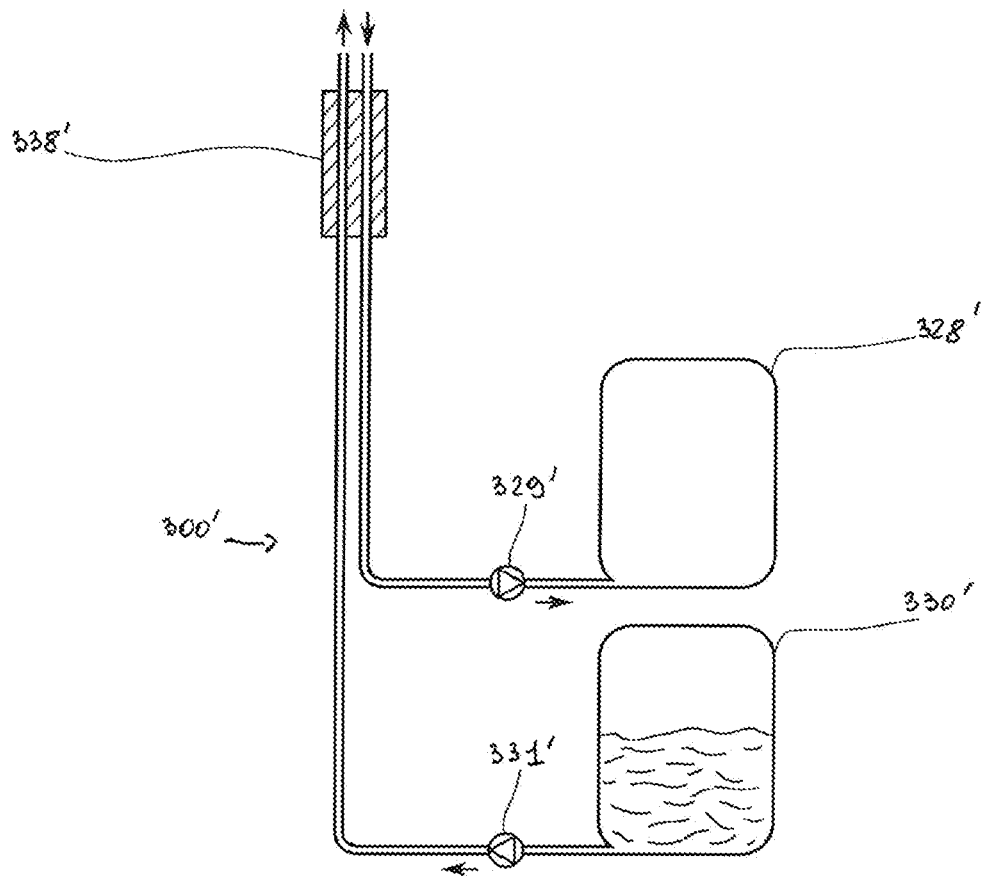
FIG. 11b is a schematic drawing of a fuel filling plant and discharge of the combustion gases from the vehicle.

FIG. 11b shows a plant 300' for filling the vehicle with fuel and for discharging the combustion gases, being a variant of the plant 300 in that it is suitable for filling and discharging a vehicle equipped with an oxygen extractor such as the vehicle 200' illustrated by the drawing of FIG. 10b. Plant 300' then only includes two tanks:

- a combustion gas storage tank 328' associated with a pump 329' for withdrawing the combustion gases stored in the tank of the vehicle. This pump 329' also serves as a compressor,
- a reservoir 330' of liquid or gaseous fuel associated with a filling pump 331' for filling the vehicle with liquid or gaseous fuel.

Each tank or reservoir or is equipped with a pipe to which is connected the pump with which they are associated.

The ends of these pipes are assembled and each equipped with an end fitting capable to be connected, so as to connect with the inlets and outlets of the vehicle, for example for the vehicle 200' of FIG. 10b. The end fittings are grouped together on a service gun 338' allowing a user to manipulate both end fittings simultaneously during the fuel tank filling phase and the gas discharging phase.

Figure 12A:
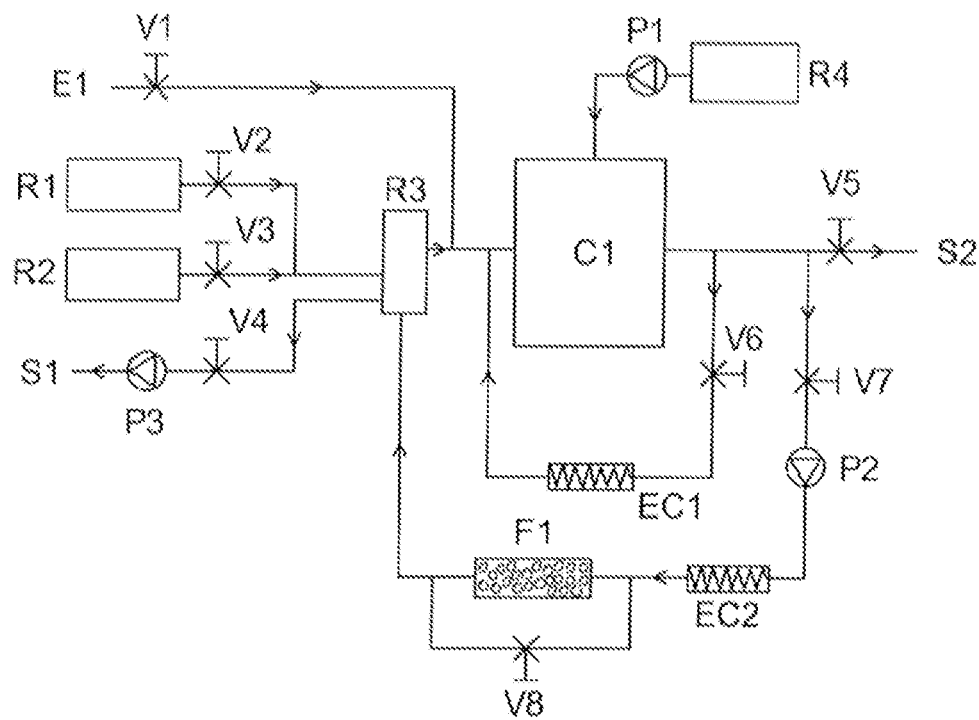
FIG. 12a is a schematic drawing of an installation for supplying oxygen and recovering heat from a combustion chamber.
Figure 12B:
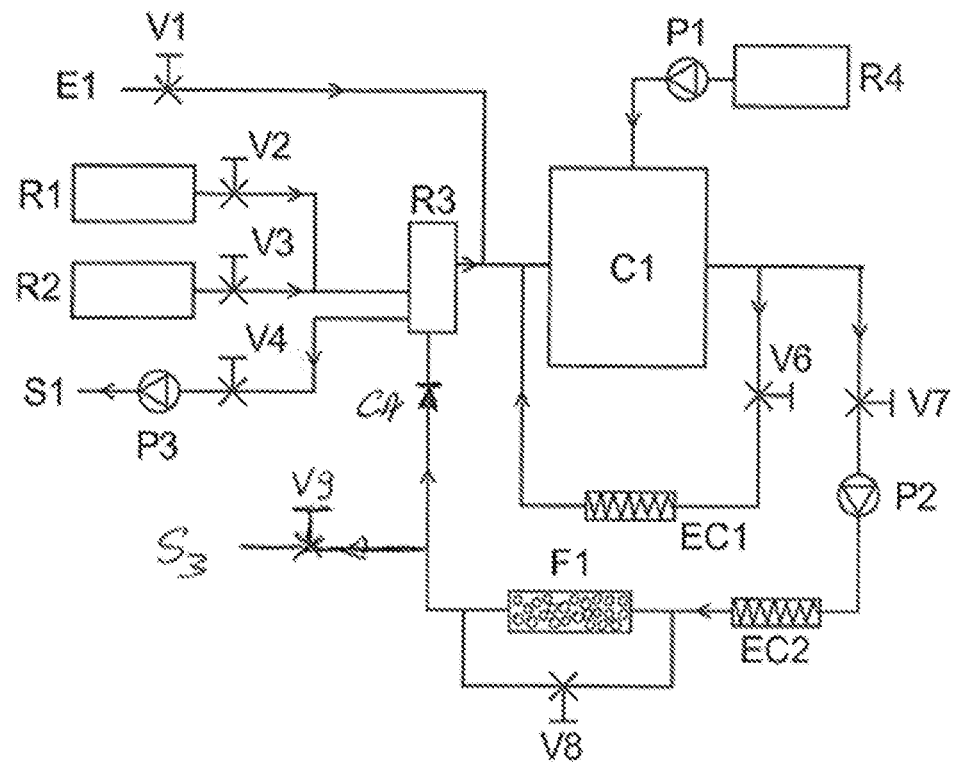
FIG. 12b is a schematic drawing of another installation for supplying oxygen and for recovering heat from a combustion chamber.
Figure 12C:
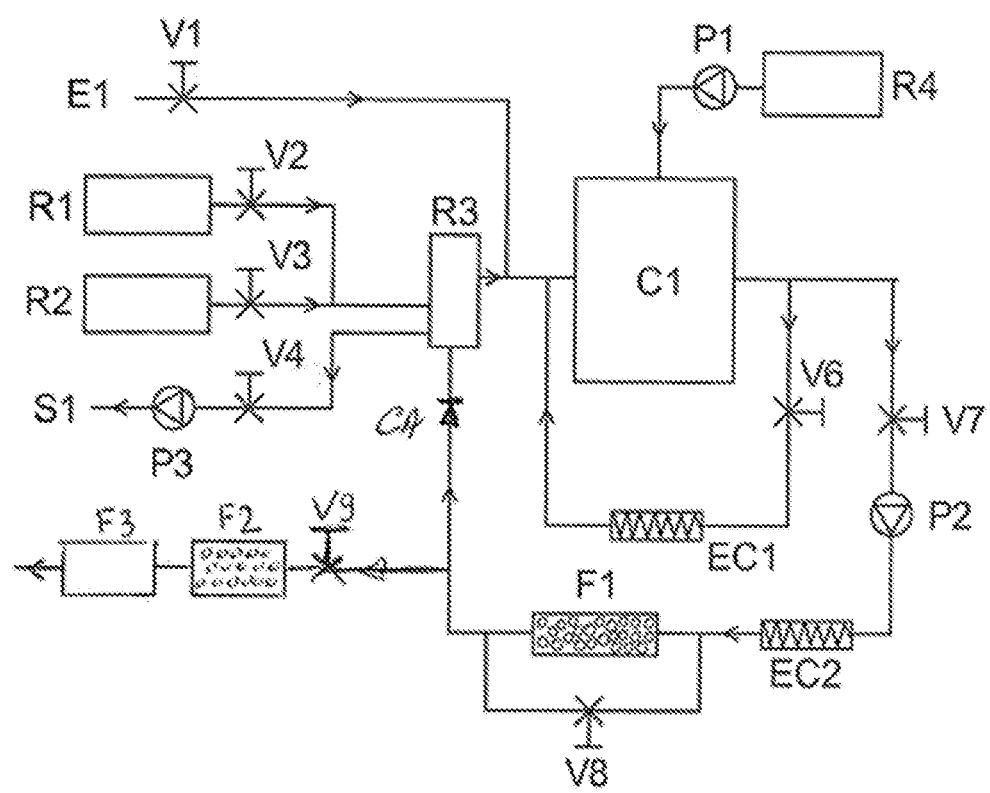
FIG. 12c is a schematic drawing of another installation for supplying oxygen and for recovering heat from a combustion chamber.

FIGS. 12a, 12b and 12c illustrate embodiments of heat recovery plants.

According to the embodiment of FIG. 12a, the installation comprises the following sub-assemblies:

P1=Fuel feed pump
E1=Atmospheric air inlet
V1=Atmospheric air inlet shut-off valve or atmospheric air flow control valve
R1=Pressurized CO2 tank
V2=CO2 shut-off valve or CO2 flow control valve
R2=Pure O2 tank
V3=O2 shut-off valve or O2 flow control valve
S1=Vacuum pump output
P3=Vacuum pump
V4=Vacuum pump circuit shut-off valve
R3=Mixing tank
R4=Fuel tank
C1=Combustion chamber
V6=Combustion gas primary recycling valve
EC1=Heat exchanger
V5=Valve for shutting off or adjusting the discharge flow of the combustion gases
S2=Outlet (evacuation) of the combustion gases in excess
V7=Valve for shutting off or adjusting the secondary recycling flow of the combustion gases
P2=Possible combustion gas recycling pump
EC2=Heat exchanger (air-combustion gas or liquid-combustion gas or air-liquid-combustion gas)-Condensation exchanger.
F1=Filter to neutralize CO2, CO and may contain LiHO2, LiO2, NaHO2, KHO2, NaOH, H2O2, K2O2, LiOH, KOH
V8=Bypass valve (optional)

Part of the cooled combustion gases from C1, freed of water vapor, is recycled and then mixed in R3 with pure oxygen from R2 for introduction of this mixture into the combustion chamber C1 of the fossil fuels and non-fossil fuels.

The embodiment of FIG. 12b differs from that of FIG. 12a in that it comprises the following subassemblies:

S3 outlet for the evacuation of excess gas,
V9 Combustion gas flow control valve and stops gas discharge.
CA: non-return valve.

The presence of the tank R1 is optional. In addition, the vacuum pump P3 does not work all the time. At the start, it is only used to create a vacuum, if operation without atmospheric air is intended, to eliminate the air in the circuit.

All the cooled combustion gases, freed of water vapor, are filtered through filters F1 containing chemical substances such as $LiHO_2$, $LiO_2$, $NaHO_2$, $KHO_2$, $NaOH$, $H_2O_2$, $K_2O_2$, $LiOH$, $KOH$ then a part of the cooled and filtered gases is recycled, then mixed with pure oxygen for the introduction of this mixture into the combustion chamber C1 of fossil fuels and non-fossil fuels.

The embodiment of FIG. 12c differs from the previous one in that it includes the following sub-assemblies:

F3: $CO_2$, $CO$, $NOx$ neutralization filter identical to F1 (containing $LiHO_2$ or $LiO_2$ or $NaHO_2$ or $KHO_2$ or $NaOH$ or $H_2O_2$.

The filter F1 can be suppressed in this embodiment due to the presence of F2. In addition, as for the previous embodiment, the tank R1 can be omitted.

In this embodiment, a portion of the cooled combustion gases, freed of water vapor, is not recycled and then is filtered through F3 filters containing chemical substances such as $LiHO_2$, $LiO_2$, $NaHO_2$, $KHO_2$, $NaOH$, $H_2O_2$, $K_2O_2$, $LiOH$, $KOH$ before being released into the atmosphere.

Figure 13:
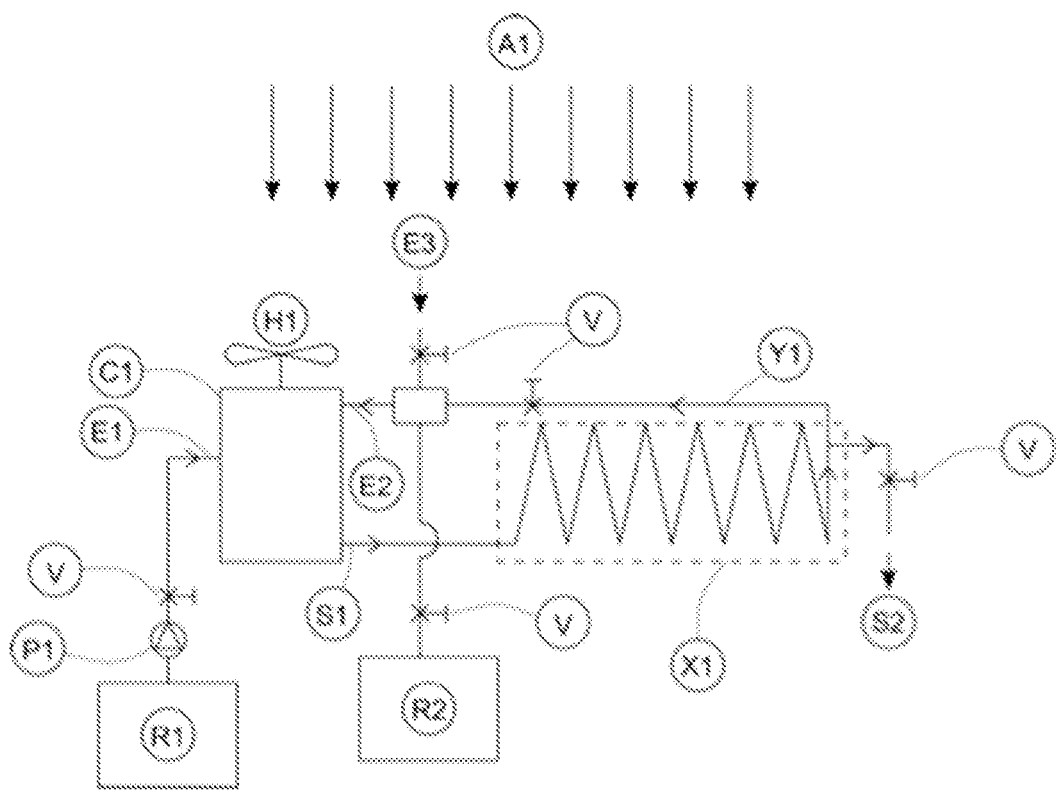
FIG. 13 is a schematic drawing of the oxygen supply and of the heat recovery from an aircraft engine.

The embodiment illustrated by the drawing of the FIG. 13 describes an application related to the operation of an aircraft engine. It includes the following:

R1=Fuel tank
P1=Fuel pump
V=Shut-off and adjustment valve
E1=Fuel inlet
C1=Combustion chamber
H1=Propeller
E2=Inlet of the oxidizer in the combustion chamber
S1=Combustion gas outlet
E3=Air inlet
A1=Ambient air
R2=Pure $O_2$ tank
X1=Condensation heat exchanger air-combustion gas or air-liquid-combustion gas or liquid-combustion gas
S2=Outlet of the combustion gas in excess
Y1=Combustion gas recycling.

The installation is organized around an H1 propeller motor, said motor being equipped with a combustion chamber C1.

In fact, part of the gases from combustion is recycled to the engine, being mixed with pure oxygen.

Figure 14:
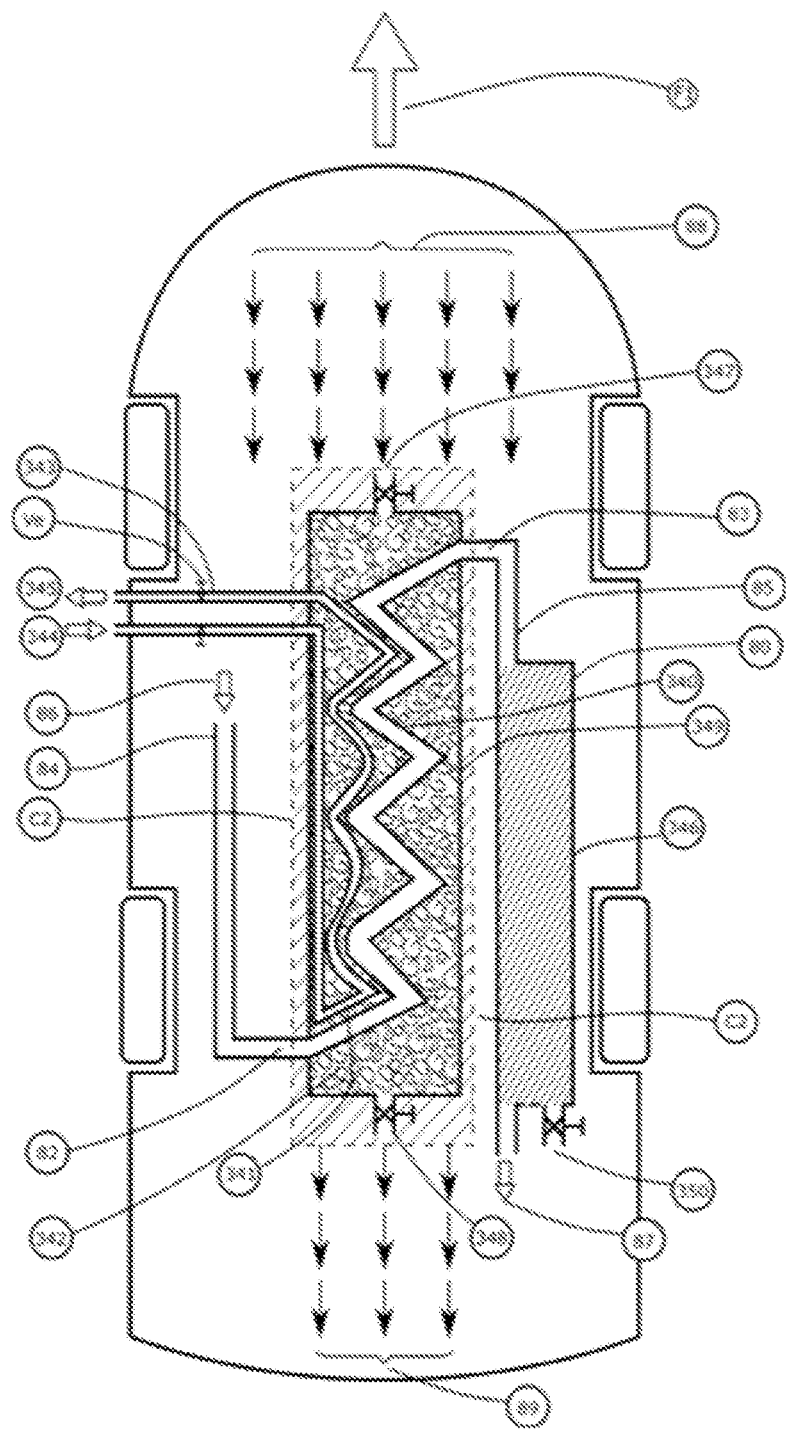
FIG. 14 is a schematic drawing of a vehicle recovering and storing heat by means of hot water.
Figure 16:
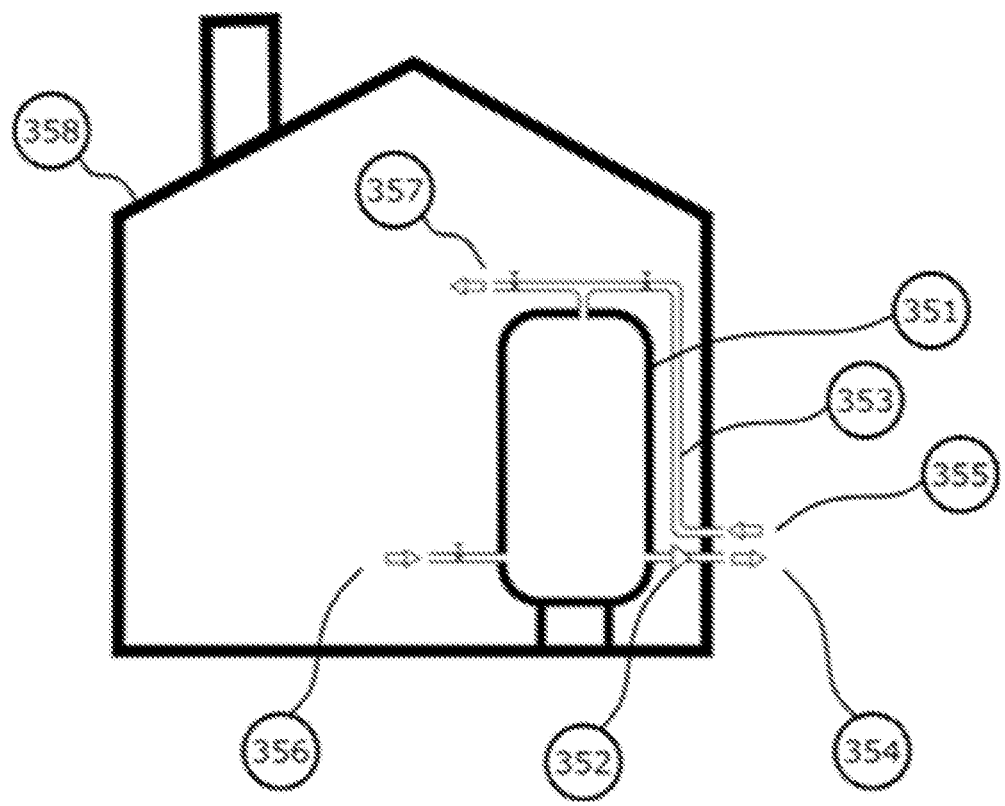
FIG. 16 is an installation recovering the hot water produced or the stored heat from the vehicles of FIGS. 14 and 15.
Figure 17:
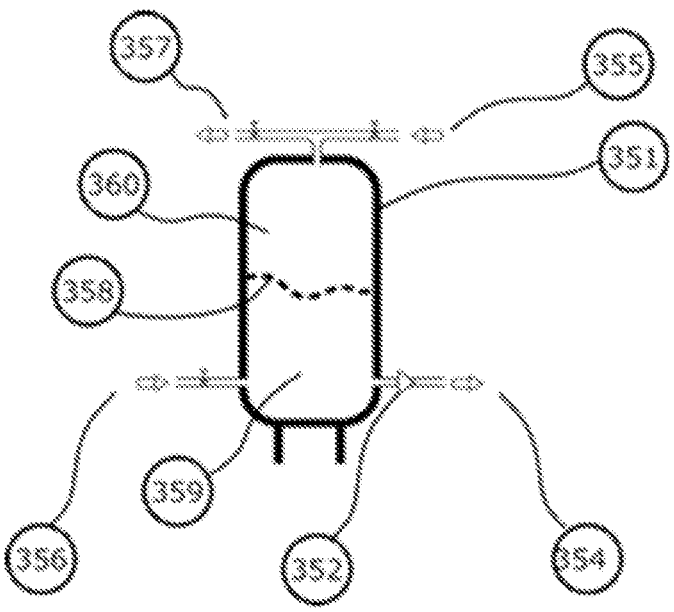
FIG. 17 is an installation recovering the hot water produced or the stored heat from the vehicles of FIGS. 14 and 15.

FIGS. 14, 16 and 17 illustrate the implementation of the method where FIG. 14 illustrates a device for cooling the hot combustion gases, for recovery and for storage of the heat (sensible and latent) of the hot combustion gases, participating in the operation of a wheeled vehicle denoted 80 as a whole. This device comprises a heat accumulator 349 containing a coolant 342, a circuit 340 for exchanging heat between the hot combustion gases and the coolant 342, a circuit 341 for exchanging heat between a cold liquid or gas 343 to heat and the coolant 342, means 347 for filling the heat accumulator 349 with the coolant 342, means 348 for drawing off (discharge) the coolant 342 from the accumulator 349. The exchange circuit 341 comprises an inlet 344 for the liquid or the gas to be heated and an outlet 345 for the outlet of the heated liquid or gas. The inlet 344 and outlet 345 can be fitted with closing plugs. Circuit 341 may comprise a circulation pump. The exchange circuit 341 can include isolation valves Ve and Vs. These valves can be controlled remotely.

According to another feature of the invention, the device comprises a second heat exchanger 346 of the combustion gas-air, combustion gas-water or combustion gas-air-water type allowing secondary cooling and condensation of the residual water vapor contained in the combustion gases leaving the outlet 83. This second exchanger 346 is connected to the heat accumulator 349.

While driving the vehicle, the hot combustion gases 86 heat the coolant 342 through the exchange circuit 340. The coolant 342 heats up and remains contained in the heat accumulator 349. The cooled gases then pass into the heat exchanger 346 in which they undergo secondary cooling and in which they are freed of the residual water vapor they contain before leaving through the outlet 87. Once the vehicle has arrived at home or at a heat recovery site, input 344 is connected to the source of gas or liquid to be heated and output 345 is connected to the tank for the storage of the heated liquid or gas.

FIG. 16 is an example of a heat recovery infrastructure installed at the parking point or at the vehicle stopping point. This infrastructure includes the following sub-assemblies:

352=Pump
351=Storage tank of the liquid or gas to be heated
354=Outlet of the liquid or cold gas to be heated, and to be connected to the outlet 345 of the vehicle
356=Entry of liquid or cold gas into the storage tank 351
357=Withdrawal of heated liquid or gas from the storage tank 351
358=Home or heat recovery center FIG. 17 is an exemplary embodiment of the liquid (LF) or gas (GF) storage tank and the use of this heated liquid or gas.

Figure 15:
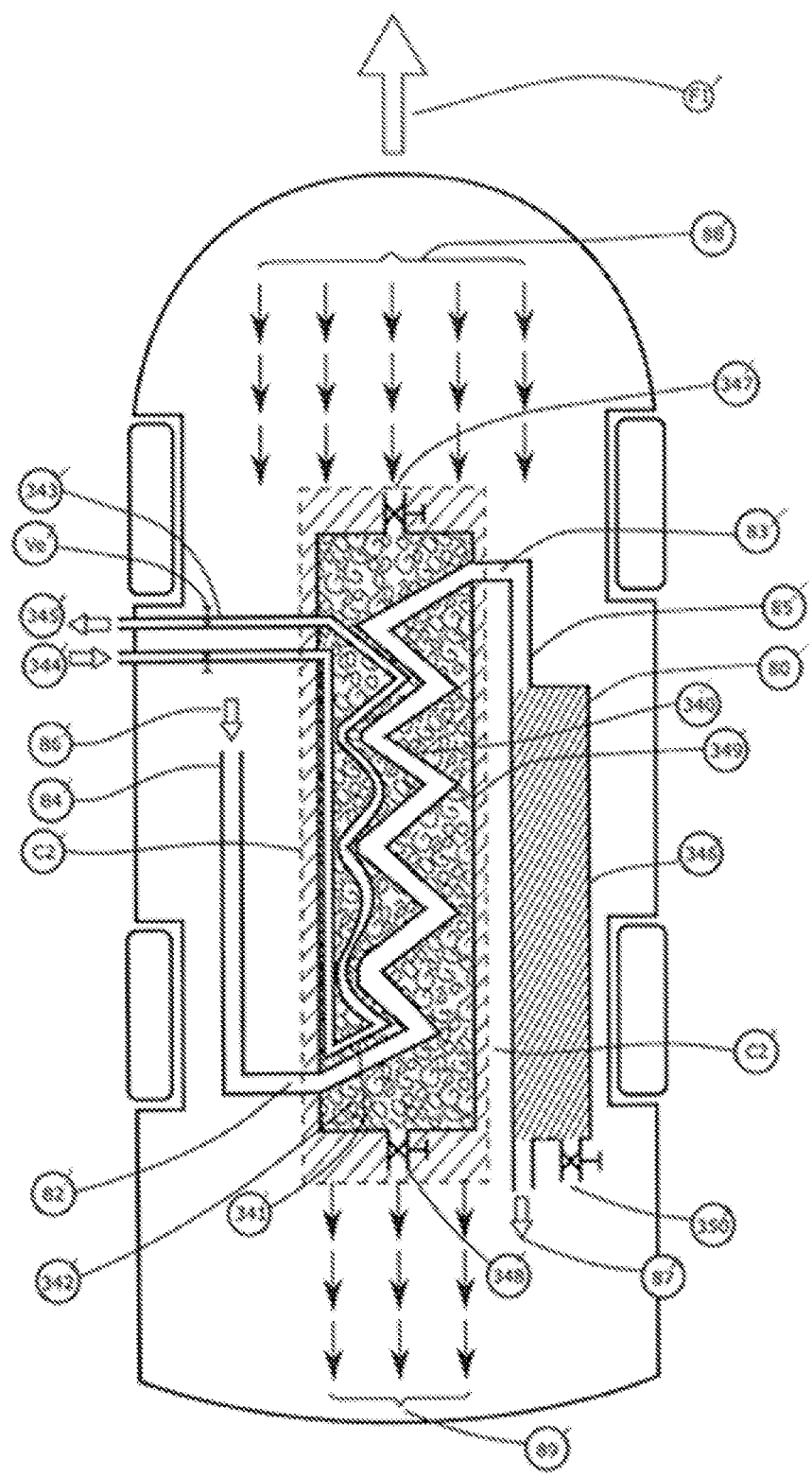
FIG. 15 is a schematic drawing of a vehicle recovering and storing heat by means of hot melt product.

The tank 351 further comprises the following elements:
358=Stretchable membrane or flexible wall (deformable)
359=Liquid or cold gas to be heated
360=Liquid or gas heated by the vehicle FIGS. 15, 16 and 17 illustrate an implementation of the method where FIG. 15 illustrates a device for cooling the hot combustion gases, for the recovery and storage of the heat (sensible and latent) of the hot combustion gases, participating in the operation of a wheeled vehicle denoted 80 as a whole. This device comprises a heat accumulator 349' containing hot-melt substances 342', a circuit 340' for exchanging heat between the hot combustion gases and the hot-melt substances 342', a circuit 341' for exchanging heat between a liquid or a cold gas 343 to be heated and the chemical substances 342' which are melted by recovery of sensible and latent heat of the hot combustion gases 86, means 347' for filling the heat accumulator 349' with hot-melt substances 342', means 348' for withdrawing (discharging) hot-melt substances 342' from the accumulator 349'. The exchange circuit 341' includes an inlet 344' for the liquid or gas to be heated and an outlet 345' for the outlet of the liquid or the heated gas. The inlet 344' and the outlet 345' can be fitted with sealing plugs. Circuit 341' may contain a circulation pump. The exchange circuit 341' may have isolation valves Ve' and Vs'. These valves can be controlled remotely.

According to another feature of the invention, the device comprises a second heat exchanger 346' of the combustion gas-air, combustion gas-water or combustion gas-air-water type allowing secondary cooling and condensation of the residual water vapor contained in the combustion gases leaving the outlet 83. This second exchanger 346' is connected to the heat accumulator 349'.

While driving the vehicle, the hot combustion gases 86 melt the hot-melt substances 342' through the exchange circuit 340'. The melted hot-melt chemical substances form a liquid which remains in the heat accumulator 349'. The cooled gases then pass into the heat exchanger 346' in which they undergo secondary cooling and in which they are freed of the residual water vapor they contain, before leaving through the outlet 87. Once the vehicle has arrived at home or on a heat recovery site, the inlet 344' is connected to the source of gas or liquid to be heated and the outlet 345' is connected to the storage tank for the heated liquid or gas.

FIG. 16 illustrates a heat recovery infrastructure installed at the parking point or at the vehicle stop and storage point.

FIG. 17 is an exemplary embodiment of the liquid (LF) or gas (GF) storage tank and the use of this heated liquid or gas.

It is understood that the method, device, vehicles and plants, which have just been described and shown above, have been described and shown for disclosure rather than limitation. Of course, various arrangements, modifications and improvements can be made to the above examples, without departing from the scope of the invention.

The invention claimed is:

1. A wheeled vehicle comprising an engine that produces hot combustion gases and a device that carries out a method of reducing an increase in air temperature of earth's atmosphere and of water temperature of earth's oceans and seas, the method consisting in reducing the increase in the earth's temperature and reducing the increase in carbon dioxide content in the earth's atmosphere by reducing a drop in oxygen content in the earth's atmosphere, which reduction in the drop in oxygen content comprises:
producing pure oxygen or producing hydrogen peroxide, and
using said pure oxygen or said hydrogen peroxide for combustion of fossil fuels and combustion of non-fossil fuels to reduce consumption of oxygen contained in air during said combustion,
the method including reducing an increase in temperature at a surface of the earth due to a release of combustion gases in the earth's atmosphere by cooling the hot combustion gases to a cooling temperature to satisfy one of the group consisting of i) a wavelength of infrared thermal radiation emitted at the cooling temperature does not match a water vapor absorption wavelength or a carbon dioxide absorption wavelength to prevent the combustion gases from heating the atmospheric air, and ii) the temperature of the cooled combustion gases is below a temperature of a dew point of the hot combustion gases so as to condense and eliminate water vapor contained in the hot combustion gases as well as latent heat to prevent the combustion gases from heating the atmospheric air,
the device of the wheeled vehicle comprising:
at least one condensation heat exchanger arranged to cool hot combustion gases from the engine, the at least one condensation heat exchanger having a volume with an entry for receiving the hot combustion gases and an outlet that discharges the cooled combustion gases,
wherein the at least one condensation heat exchanger comprises at least one of:
a hot gas and air condensation heat exchanger with a hot gas circuit and an air circuit, the hot gas circuit and the air circuit being separated and operating in counterflow,
a hot gas and liquid condensation heat exchanger with a hot gas circuit and a liquid circuit, the hot gas circuit and the liquid circuit being separated and operating in counterflow, and
a hot gas-liquid and air type condensation heat exchanger with a hot gas circuit, a liquid circuit, and an air circuit that are separated from each other, with the air circuit and the liquid circuit operating on in co-current with each other and in counterflow with the hot gas circuit,
wherein the wheeled vehicle uses one of the group consisting of:
fossil fuel and air containing the produce pure oxygen for combustion of the fossil fuel,
fossil fuel and the produced pure oxygen for combustion of the fossil fuel, and
a non-fossil fuel and the produced pure oxygen for the combustion of the non-fossil fuel,
wherein the wheeled vehicle produces the hot combustion gases while advancing in a first direction, and
wherein with the wheeled vehicle advancing in the first direction, the hot combustion gases enter the entry to the volume of the at least one condensation heat exchanger, the entry to the volume of the at least one condensation heat exchanger being located downstream at a rear of the wheeled vehicle, and the outlet of the at least one condensation heat exchanger being located upstream, relative to the entry, so that the combustion gases, cooled by the at least one condensation heat exchanger, are discharged at a location upstream of the entry to the volume of the at least one condensation heat exchanger.

2. The wheeled vehicle of claim 1, wherein the at least one condensation heat exchanger is the hot gas and air condensation heat exchanger, and the device further comprises:
a supply pipe that receives the hot combustion gases from the engine and discharges the hot combustion gases to the entry to the volume of the hot gas and air condensation heat exchanger;
an outlet pipe connected to the outlet of the hot gas and air condensation heat exchanger, the outlet pipe extending along the hot gas and air condensation heat exchanger and returning to the rear of the vehicle, the outlet pipe receiving, from the outlet of the hot gas and air condensation heat exchanger, the cooled combustion gases, freed of water vapor, and returning the cooled combustion gases to the rear of the vehicle,
wherein the hot gas and air condensation heat exchanger is positioned with cooling air being received at a front of the vehicle during the wheeled vehicle advancing in the first direction,
wherein the cooling air serves for cooling the hot combustion gases and for condensing the water vapor contained in the hot combustion gases and then is discharged at the rear of the vehicle, and
wherein the entry for the hot combustion gases is located on a rear part of the hot gas and air condensation heat exchanger while the outlet of the hot gas and air condensation heat exchanger is located at a front of the hot gas and air condensation heat exchanger;
at least one partition that separates the supply pipe from the hot gas and air condensation heat exchanger; and
at least one partition that separates the outlet pipe from the hot gas and air condensation heat exchanger.

3. The wheeled vehicle of claim 1, wherein the at least one condensation heat exchanger is the hot gas and air condensation heat exchanger, and the device further comprises:
a supply pipe that receives the hot combustion gases from the engine and discharges the hot combustion gases to the entry to the volume of the hot gas and air condensation heat exchanger;
an outlet pipe connected to the outlet of the hot gas and air condensation heat exchanger, the outlet pipe extending along the hot gas and air condensation heat exchanger and returning towards the rear of the vehicle, the outlet pipe receiving, from the outlet of the hot gas and air condensation heat exchanger, the cooled combustion gases, freed of water vapor, wherein the hot gas and air condensation heat exchanger is positioned with cooling air being received at a front of the vehicle during the wheeled vehicle advancing in the first direction, wherein the cooling air serves for cooling the hot combustion gases and for condensing the water vapor contained in the hot combustion gases and then is discharged at the rear of the vehicle, and wherein the entry for the hot combustion gases is located on a rear part of the hot gas and air condensation heat exchanger while the outlet of the hot gas and air condensation heat exchanger is located at a front of the hot gas and air condensation heat exchanger;

at least one partition that separates the supply pipe from the hot gas and air condensation heat exchanger;

at least one partition that separates the outlet pipe from the hot gas and air condensation heat exchanger; and a sub-assembly connected to a discharge of the outlet pipe, the sub-assembly recovering, from said discharge of the outlet pipe, said cooled combustion gases, the sub-assembly including a storage tank for the cooled combustion gases, where the discharge of the outlet pipe leads to the storage tank, the sub-assembly further including a compression pump and a non-return valve that controls filling of a volume of the storage tank from the discharge of the outlet pipe outlet, and the sub-assembly further including a valve that controls discharging of said storage tank.

4. The wheeled vehicle of claim 3, wherein said storage tank contains at least one chemical reagent in solid and/or liquid form for dissolving and/or chemically neutralizing $CO_2$.

5. The wheeled vehicle of claim 3, further comprising a pure oxygen tank with a starting line extending towards the engine and a filling line emerging on an outside of the wheeled vehicle.

6. The wheeled vehicle of claim 4, further comprising a pure oxygen tank with a starting line extending towards the engine and a filling line emerging on an outside of the wheeled vehicle.

7. The wheeled vehicle of claim 5, further comprising an oxygen extractor for extracting oxygen from the air with a pipe connecting the oxygen extractor and the pure oxygen tank.

8. The wheeled vehicle of claim 6, further comprising an oxygen extractor for extracting oxygen from the air with a pipe connecting the oxygen extractor and the pure oxygen tank.

9. The wheeled vehicle of claim 1, further comprising a condensed water storage tank.

10. The wheeled vehicle of claim 1, further comprising a condensed water storage tank filled with treated water.

11. The wheeled vehicle of claim 1, further comprising a tank containing the pure hydrogen peroxide, wherein the hydrogen peroxide has a hydrogen peroxide concentration by mass comprised between 30 and 70%.

12. The wheeled vehicle of claim 1, further comprising a storage tank connected to the outlet of the at least one condensation heat exchanger, the storage tank storing for all or part of the cooled combustion gas.

13. The wheeled vehicle of claim 1, further comprising filters mounted at the outlet of the at least one condensation heat exchanger, the filters for filtering chemical substances.

14. A combination of the wheeled vehicle of claim 3 and a maintenance plant, wherein the maintenance plant comprises a plurality of reservoirs associated with pipes capable of simultaneously connecting to the wheeled vehicle, with a reservoir of fossil fuel or non-fossil fuel to supply the wheeled vehicle tank, and a discharge reservoir for the discharge of the gas storage tank fitted to the wheeled vehicle.

15. The combination of claim 14, wherein the wheeled vehicle further comprises a tank for containing the produced oxygen or the produced pure hydrogen peroxide, and wherein the maintenance plant further comprises a reservoir of the produced oxygen or the produced hydrogen peroxide to supply the tank for containing the produced oxygen or the produced pure hydrogen peroxide.

16. A combination of the wheeled vehicle of claim 4 and a maintenance plant, wherein the maintenance plant comprises a plurality of reservoirs associated with pipes capable of simultaneously connecting to the wheeled vehicle, with a reservoir of fossil fuel or non-fossil fuel to supply the wheeled vehicle tank, and a discharge reservoir for the discharge of the gas storage tank fitted to the wheeled vehicle.

17. The combination of claim 16, wherein the wheeled vehicle further comprises a tank for containing the produced oxygen or the produced pure hydrogen peroxide, and wherein the maintenance plant further comprises a reservoir of the produced oxygen or the produced hydrogen peroxide to supply the tank for containing the produced oxygen or the produced pure hydrogen peroxide.

* * * * *